(12) United States Patent
Ujma et al.

(10) Patent No.: US 11,756,775 B2
(45) Date of Patent: Sep. 12, 2023

(54) METHOD OF CHARACTERISING MOLECULES BY ION-MOBILITY SPECTROMETRY

(71) Applicant: Micromass UK Limited, Wilmslow (GB)

(72) Inventors: Jakub Ujma, Manchester (GB); Kevin Giles, Stockport (GB); Nick Tomczyk, Altrincham (GB)

(73) Assignee: Micromass UK Limited, Wilmslow (GB)

( * ) Notice: Subject to any disclaimer, the term of this patent is extended or adjusted under 35 U.S.C. 154(b) by 273 days.

(21) Appl. No.: 17/298,159

(22) PCT Filed: Nov. 29, 2019

(86) PCT No.: PCT/GB2019/053381
§ 371 (c)(1),
(2) Date: May 28, 2021

(87) PCT Pub. No.: WO2020/109814
PCT Pub. Date: Jun. 4, 2020

(65) Prior Publication Data
US 2022/0074892 A1    Mar. 10, 2022

(30) Foreign Application Priority Data

Nov. 29, 2018 (GB) .................................... 1819487
Jan. 28, 2019 (GB) .................................... 1901111

(51) Int. Cl.
*H01J 49/00* (2006.01)
*G01N 27/624* (2021.01)
(Continued)

(52) U.S. Cl.
CPC ........ *H01J 49/0045* (2013.01); *G01N 27/624* (2013.01); *H01J 49/005* (2013.01);
(Continued)

(58) Field of Classification Search
CPC . G01N 27/622; G01N 27/624; H01J 49/0036; H01J 49/005; H01J 49/40; H01J 49/004; H01J 49/0045; H01J 49/4225
(Continued)

(56) References Cited

U.S. PATENT DOCUMENTS 9,653,271 B2 * 5/2017 Shion .................... H01J 49/165
9,984,861 B2   5/2018 Giles et al.
(Continued)

FOREIGN PATENT DOCUMENTS

GB   2440970 A   2/2008
GB   2555247 A   4/2018

OTHER PUBLICATIONS

International Search Report and Written Opinion for International Application No. PCT/GB2019/053381, dated Jan. 30, 2020.
(Continued)

*Primary Examiner* — Kiet T Nguyen
(74) *Attorney, Agent, or Firm* — Goodwin Procter LLP

(57) ABSTRACT

A method of identifying and/or characterising ions comprises separating analyte ions according to a first physico-chemical property (ion-mobility), selecting first ions of the analyte ions, and activating, fragmenting or reacting the first ions to produce first product ions, separating the first product ions according to the first physico-chemical property, and determining a pattern of the first product ions. The first ions are identified and/or characterised using the pattern of the first product ions.

20 Claims, 15 Drawing Sheets

(51) Int. Cl.
*H01J 49/40* (2006.01)
*H01J 49/42* (2006.01)

(52) U.S. Cl.
CPC .......... *H01J 49/0036* (2013.01); *H01J 49/40* (2013.01); *H01J 49/4225* (2013.01)

(58) Field of Classification Search
USPC ................................ 250/287, 286, 281, 282
See application file for complete search history.

(56) References Cited

U.S. PATENT DOCUMENTS

| | | |
|---|---|---|
| 2007/0176092 A1 | 8/2007 | Miller et al. |
| 2018/0158665 A1 | 6/2018 | Eiceman et al. |
| 2018/0269048 A1* | 9/2018 | Jarvis ................. H01J 49/0036 |

OTHER PUBLICATIONS

Combined Search and Examination Report for GB Application No. GB1917445.7, dated May 7, 2020.
"Tandem mass spectrometry", Wikipedia, Nov. 7, 2018, pp. 1-16, Retrieved from the Internet: URL: https://en.wikipedia.org/windexphptitle=Tandem_mass_spectrometry&oldid=867704314, [retrieved on Jan. 13, 2020].
Koeniger, S. L., et al. "An IMS-IMS analogue of MS-MS", Analytical Chemistry, American Chemical Society, US, 78(12):4161-4174, Jun. 15, 2006.
Srebalus Barnes, C.A., et al., "Resolving isomeric peptide mixtures: A combined HPLC/Ion mobility-TOFMS analysis of a 4000-component combinatorial library". Analytical Chemistry, American Chemical Society, US, 74 (1):26-36, Jan. 1, 2002.
Merenbloom, S.I., et al., "Improving the Efficiency of IMS-IMS by a Combing Technique", Analytical Chemistry, 80(6):1918-1927. Mar. 15, 2008.
Deng. L., et al., "Ion Mobility Separations of Isomers based upon Long Path Length Structures for Lossless Ion Manipulations Combined with Mass Spectrometry", ChemistrySelect, 1(10): 2396-2399, Jul. 1, 2016.
Gaye, M. M., et al., "Investigating carbohydrate isomers by IMS-CID-IMS-MS: precursor and fragment ion cross-sections", Analyst, 140:6922-6932, Aug. 7, 2015.
Gray, C. J., et al., "Bottom-Up Elucidation of Glycosidic Bond Stereochemistry", Anal. Chem., 89:4540-4549, (2017).
Li, H., et al., "Carbohydrate Structure Characterization by Tandem Ion Mobility Mass Spectrometry (IMMS)2", Anal. Chem., 85(5): 2760-2769, Mar. 5, 2013.
Nagy, G., et al., "Unraveling the isomeric heterogeneity of glycans: ion mobility separations in structures for lossless on manipulations", Chem. Commun., 54:11701-11704, Sep. 25, 2018.

* cited by examiner

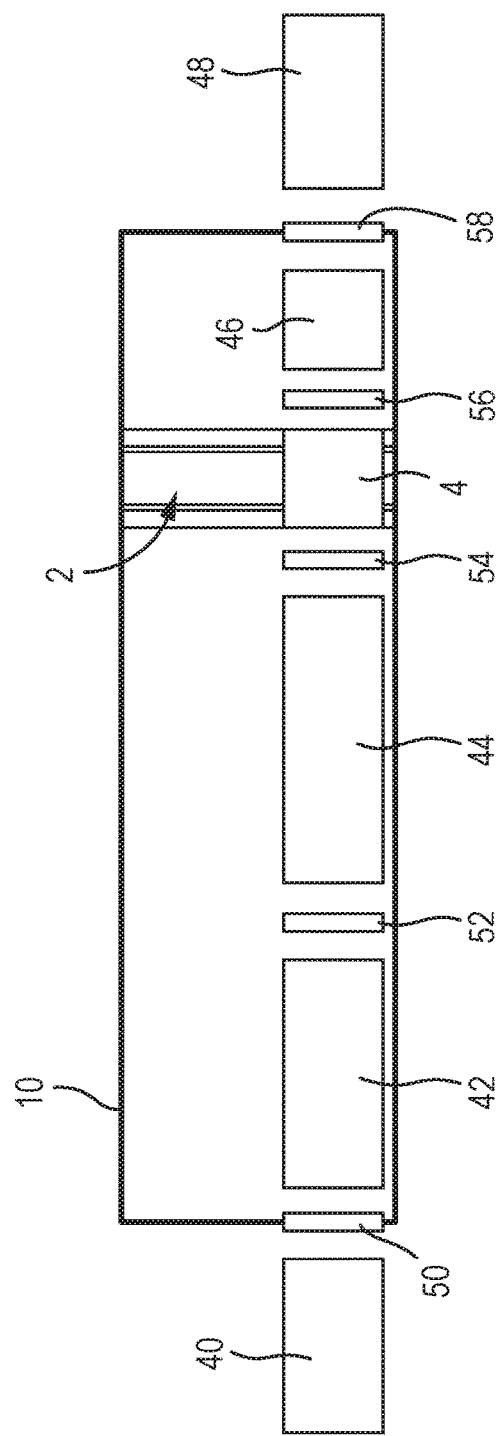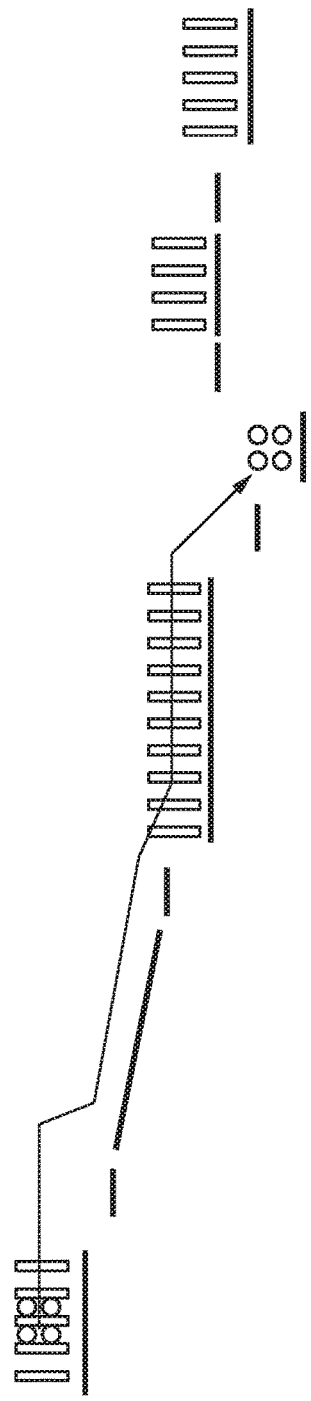

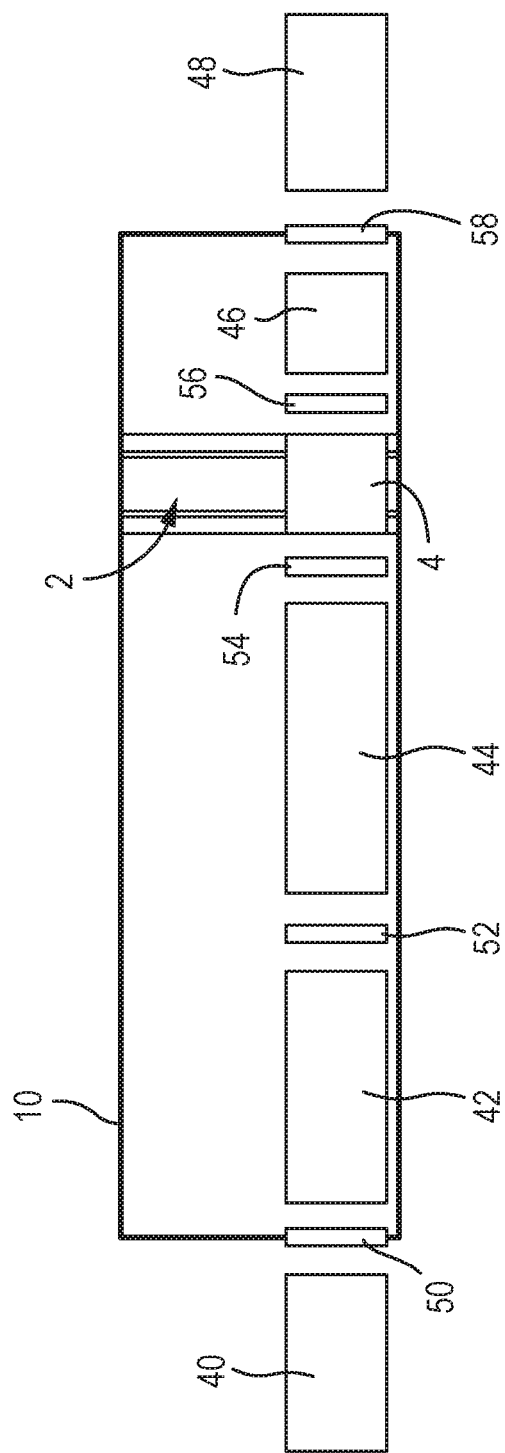
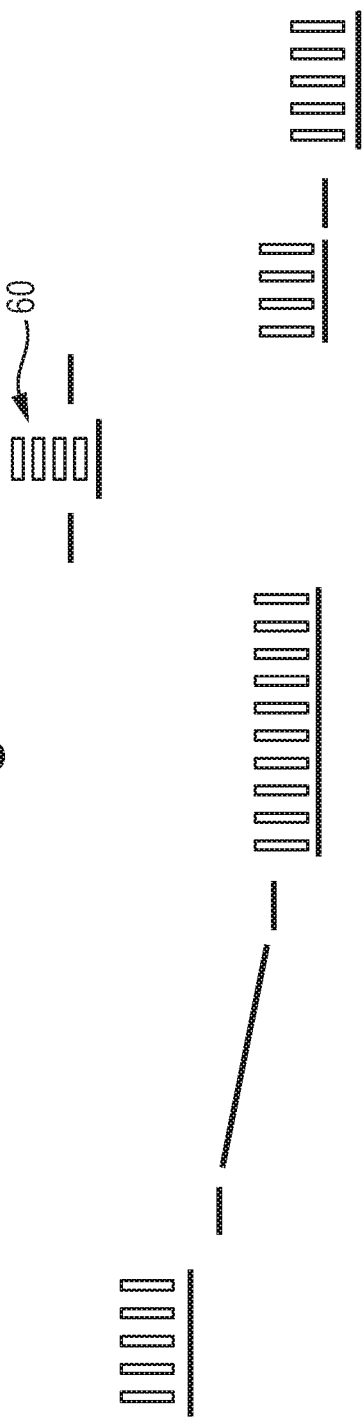

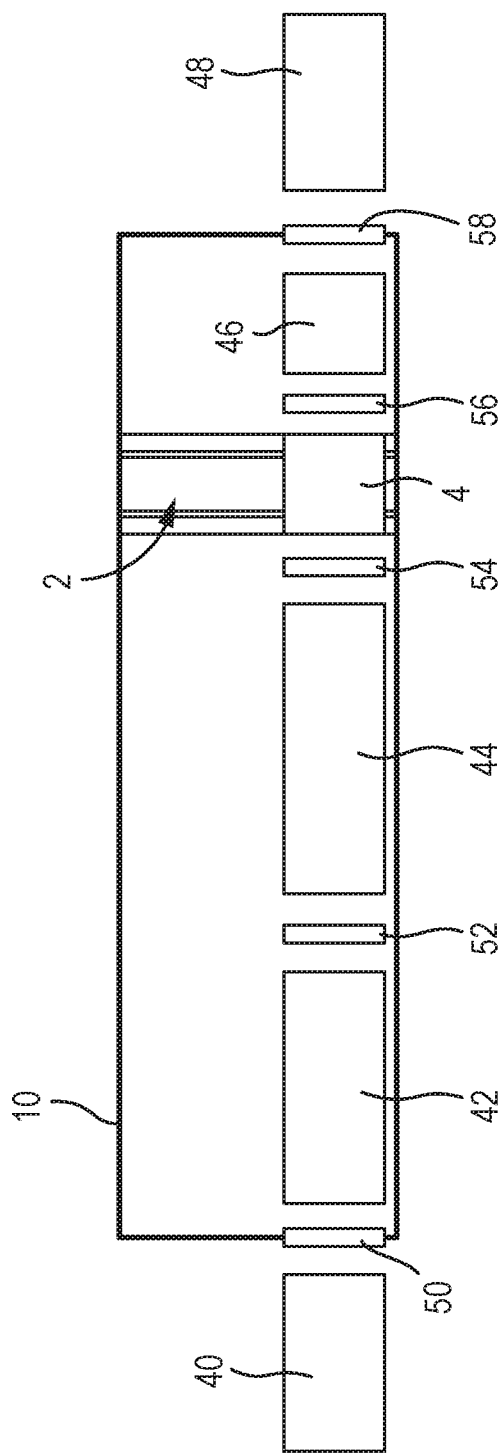
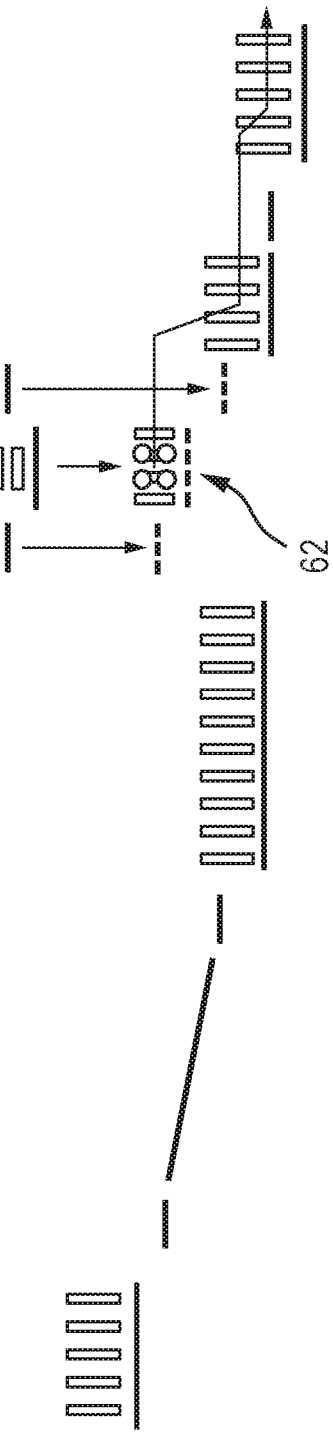

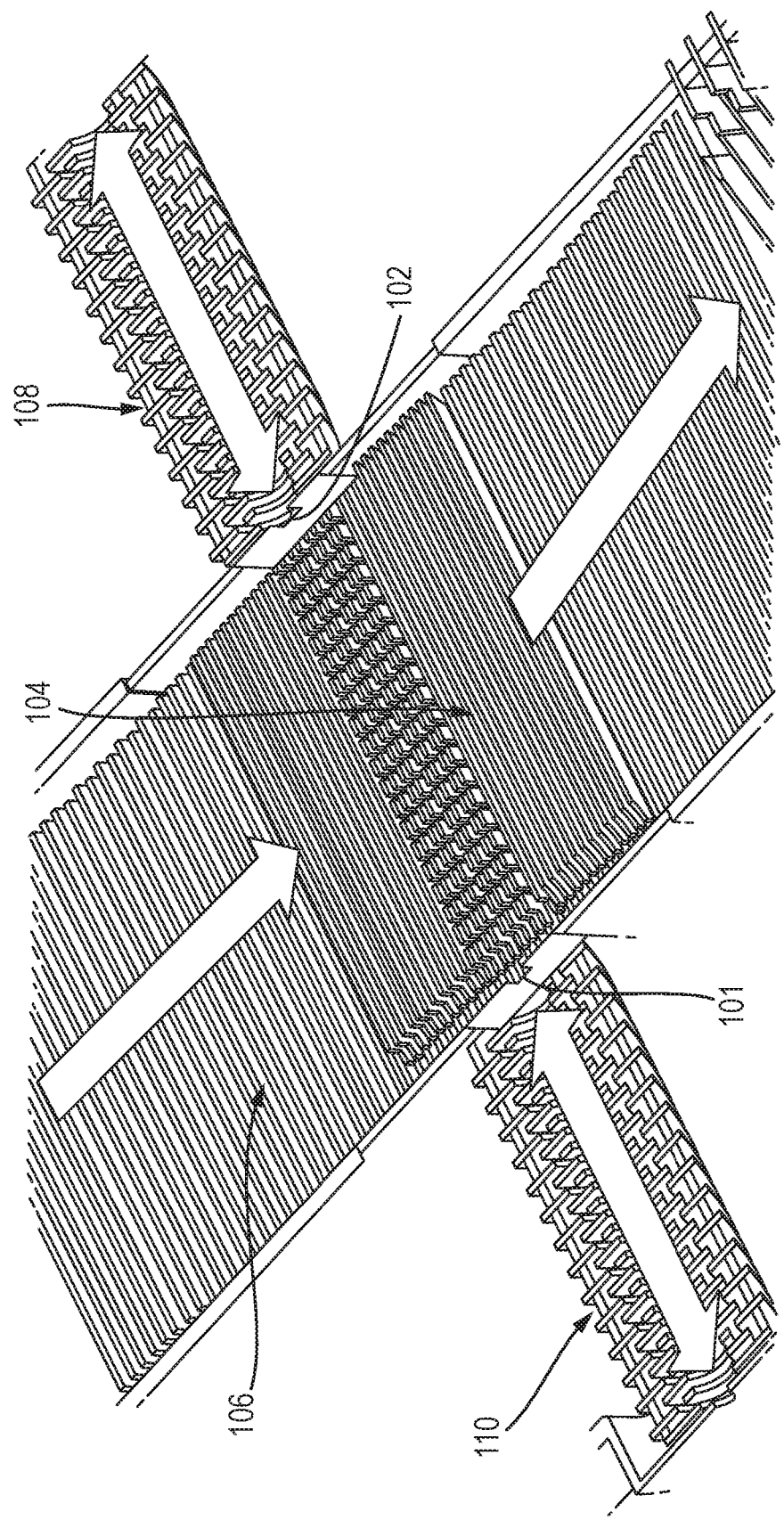

METHOD OF CHARACTERISING MOLECULES BY ION-MOBILITY SPECTROMETRY

CROSS REFERENCE TO RELATED APPLICATIONS

This application is a U.S. national phase filing claiming the benefit of and priority to International Patent Application No. PCT/GB2019/053381, filed Nov. 29, 2019, which claims priority from and the benefit of United Kingdom patent application No. 1819487.8 filed on Nov. 29, 2018 and United Kingdom patent application No. 1901111.3 filed on Jan. 28, 2019. The entire contents of these applications are incorporated herein by reference.

FIELD OF THE INVENTION

The present invention provides a method of characterising molecules using an analytical instrument such as a mass and/or ion mobility spectrometer, and in particular a method for determining sequence and/or connectivity information of polymeric molecules.

BACKGROUND

There is increasing focus on the study of polymeric molecules using mass and/or ion mobility spectrometry systems from areas including the biopharmaceutical interest in oligosaccharides and glycosylation, to the industrial interest in synthetic polymers and petroleum hydrocarbons. The ability to characterise the chain length, branching, type of monomers, connectivity and/or tacticity is desirable for these sample types.

Standard ion mobility-mass spectrometry (IM-MS) approaches to characterise polymeric molecules typically rely on either pre- or post-ion mobility fragmentation to characterise the mass and mobility of precursor and fragment ions. These approaches can be quite successful in characterising molecules consisting of subunits with different mass or mobility but not necessarily where molecules consist of identical subunits with different connectivity, tacticity and/or branching.

The Applicants believe that there remains scope for improvements to methods of characterising molecules.

SUMMARY

According to an aspect, there is provided a method of identifying and/or characterising ions, the method comprising:

separating analyte ions according to a first physico-chemical property;

selecting first ions of the analyte ions and activating, fragmenting or reacting the first ions to produce first product ions;

separating the first product ions according to the first physico-chemical property, and determining a pattern of the first product ions; and identifying and/or characterising the first ions using the pattern of the first product ions.

Various embodiments relate to methods in which analyte ions are separated according to a physico-chemical property, first ions of the analyte ions are fragmented or reacted to produce first product ions, and then the first product ions (derived from the separated first ions) are separated according to the (same) physico-chemical property. Thus, in various embodiments, analyte ions are separated and then selected product ions derived from the separated analyte ions are themselves separated.

According to various embodiments, a pattern of the separated first product ions is determined, and is used to identify and/or characterise the first ions. In this regard (and as will be described in more detail below), the Applicants have recognised that these experiments can give rise to fragmentation patterns that are characteristic of (and that may be unique to) the particular selected first ions of the analyte ions, particularly where the first ions are ions of a polymeric molecule.

It will be appreciated, therefore, that the various embodiments provide an improved method of identifying and/or characterising ions.

The first physico-chemical property may comprise ion mobility or rate of change of ion mobility with electric field strength.

The analyte ions may be polymeric. The first ions may be polymeric. The first product ions may be polymeric.

The analyte ions may be isomeric. The first ions may be isomeric. The first product ions may be isomeric.

The analyte ions may comprise isomeric polymeric analyte ions of a particular order. The first product ions may comprise polymeric product ions of a plurality of different orders. Each order of the plurality of different orders may be less than the particular order of the isomeric polymeric analyte ions.

The pattern of the first product ions may comprise, in respect of one or more or each order of the plurality of different orders, the number of isomers of that order that are present in the first product ions.

Characterising the first ions using the pattern of the first product ions may comprise determining structural information of the first ions from the pattern of the first product ions.

The method may comprise:

selecting second ions of the analyte ions, and activating, fragmenting or reacting the second ions to produce second product ions;

separating the second product ions according to the first physico-chemical property, and determining a pattern of the second product ions; and identifying and/or characterising the first and/or second ions using the pattern of the second product ions.

The method may comprise comparing the pattern of the first product ions with the pattern of the second product ions, and identifying and/or characterising the first and/or second ions on the basis of the comparison.

The method may comprise:

selecting particular ions of the first product ions, and activating, fragmenting or reacting the particular ions to produce second generation product ions; and separating the second generation product ions according to the first physico-chemical property, and determining a pattern of the second generation product ions;

wherein the pattern of the first product ions includes the pattern of the second generation product ions.

The method may comprise separating the analyte ions according to the first physico-chemical property using a cyclic or closed-loop separator and separating the first product ions according to the first physico-chemical property using the cyclic or closed-loop separator.

According to an aspect, there is provided a method of mass and/or ion mobility spectrometry, comprising the method as described above.

According to an aspect there is provided a mass and/or ion mobility spectrometer, comprising:

one or more activation, collision, fragmentation or reaction devices;

one or more separators; and a control system, wherein the control system is configured:

to cause the one or more separators to separate analyte ions according to a first physico-chemical property;

to cause first ions of the analyte ions to be selected, and to cause the one or more activation, collision, fragmentation or reaction devices to activate, fragment or react the first ions to produce first product ions;

to cause the one or more separators to separate the first product ions according to the first physico-chemical property;

to determine a pattern of the first product ions; and to identify and/or characterise the first ions using the pattern of the first product ions.

The first physico-chemical property may comprise ion mobility or rate of change of ion mobility with electric field strength.

The spectrometer may comprise an ion source configured to generate the analyte ions.

The analyte ions may be polymeric. The first ions may be polymeric. The first product ions may be polymeric.

The analyte ions may be isomeric. The first ions may be isomeric. The first product ions may be isomeric.

The analyte ions may comprise isomeric polymeric analyte ions of a particular order. The first product ions may comprise polymeric product ions of a plurality of different orders, each order of the plurality of different orders being less than the particular order of the isomeric polymeric analyte ions.

The control system may be configured to determine the pattern of the first product ions by:

determining, in respect of one or more or each order of the plurality of different orders, the number of isomers of that order that are present in the first product ions.

The control system may be configured to characterise the first ions using the pattern of the first product ions by determining structural information of the first ions from the pattern of the first product ions.

The control system may be configured:

to cause second ions of the analyte ions to be selected, and to cause the one or more activation, collision, fragmentation or reaction devices to activate, fragment or react the second ions to produce second product ions;

to cause the one or more separators to separate the second product ions according to the first physico-chemical property;

to determine a pattern of the second product ions; and to identify and/or characterise the first and/or second ions using the pattern of the second product ions.

The control system may be configured:

to cause particular ions of the first product ions to be selected, and to cause the one or more activation, collision, fragmentation or reaction devices to activate, fragment or react the particular ions to produce second generation product ions; and to cause the one or more separators to separate the second generation product ions according to the first physico-chemical property; and to determine a pattern of the second generation product ions;

wherein the pattern of the first product ions may include the pattern of the second generation product ions.

The one or more separators may comprise a cyclic or closed-loop separator.

According to an aspect there is provided a computer readable medium storing software code, which when executing on a processor, causes the processor to perform a method of identifying and/or characterising molecules, the method comprising:

determining a pattern of first product ions, the first product ions being produced by separating analyte ions according to a first physico-chemical property, selecting first ions of the analyte ions and fragmenting or reacting the first ions to produce the first product ions; and identifying and/or characterising the first ions using the pattern of the first product ions.

According to an aspect, there is provided a method of mass spectrometry and/or ion mobility spectrometry, the method comprising:

separating analyte ions according to their ion mobility or according to their rate of change of ion mobility with electric field strength;

selecting first ions of the analyte ions and fragmenting or reacting the first ions to produce first product ions;

separating the first product ions according to their ion mobility or according to their rate of change of ion mobility with electric field strength, and determining an ion mobility pattern of the first product ions; and identifying and/or characterising the first ions using the ion mobility pattern of the first product ions.

Various embodiments relate to methods in which analyte ions are separated according their ion mobility or according to their rate of change of ion mobility with electric field strength, first ions of the analyte ions are fragmented or reacted to produce first product ions, and then the first product ions (derived from the separated first ions) are separated according to their ion mobility or according to their rate of change of ion mobility with electric field strength. Thus, in various embodiments, analyte ions are mobility separated and then product ions derived from the mobility separated analyte ions are themselves mobility separated, i.e. using an "IMS$^2$" (or more generally an "IMS$^n$") technique.

According to various embodiments, an ion mobility pattern of the ion mobility separated first product ions is determined, and is used to identify and/or characterise the first ions. In this regard (and as will be described in more detail below), the Applicants have recognised that the "IMS$^2$" (or "IMS") experiments can give rise to ion mobility fragmentation patterns that are characteristic of (and that may be unique to) the particular selected first ions of the analyte ions, e.g. particularly where the first ions are ions of a polymeric molecule.

It will be appreciated, therefore, that the various embodiments provide an improved method of mass and/or ion mobility spectrometry.

The analyte ions may be polymeric. The first ions may be polymeric. The first product ions may be polymeric.

The analyte ions may be isomeric. The first ions may be isomeric. At least some of the first product ions may be isomeric.

The analyte ions may comprise isomeric polymeric analyte ions of a particular order, and the first product ions may comprise polymeric product ions of a plurality of different orders, where each order of the plurality of different orders may be less than the particular order of the isomeric polymeric analyte ions.

The polymeric product ions of one or more or each order of the plurality of different orders may comprise plural isomers.

The ion mobility pattern of the first product ions may comprise, in respect of one or more or each order of the plurality of different orders, the number of isomers of that order that are present in the first product ions.

Characterising the first ions using the ion mobility pattern of the first product ions may comprise determining structural information of the first ions from the ion mobility pattern of the first product ions.

The method may comprise selecting second ions of the analyte ions, and fragmenting or reacting the second ions to produce second product ions.

The method may comprise separating the second product ions according to their ion mobility or according to their rate of change of ion mobility with electric field strength, and determining an ion mobility pattern of the second product ions.

The method may comprise identifying and/or characterising the first and/or second ions using the ion mobility pattern of the second product ions.

The second ions may be polymeric. The second product ions may be polymeric.

The first and second ions may be isomeric. At least some of the first and second product ions may be isomeric.

The method may comprise comparing the ion mobility pattern of the first product ions with the ion mobility pattern of the second product ions, and identifying and/or characterising the first and/or second ions on the basis of the comparison.

The method may comprise selecting particular ions of the first product ions, and fragmenting or reacting the particular ions to produce second generation product ions.

The method may comprise separating the second generation product ions according to their ion mobility or according to their rate of change of ion mobility with electric field strength, and determining an ion mobility pattern of the second generation product ions.

The ion mobility pattern of the first product ions may include the ion mobility pattern of the second generation product ions.

The second generation product ions may be polymeric. At least some of the second generation product ions may be isomeric.

The method may comprise separating the analyte ions according to their ion mobility using a cyclic or closed-loop ion mobility separator and separating the first and/or second product ions according to their ion mobility using the cyclic or closed-loop ion mobility separator.

According to an aspect there is provided a computer readable medium storing software code, which when executing on a processor, causes the processor to perform the method described above.

According to an aspect, there is provided an analytical instrument such as a mass and/or ion mobility spectrometer, comprising:

one or more collision, fragmentation or reaction devices;
one or more ion mobility separators; and
a control system, wherein the control system is configured:
to cause the one or more ion mobility separators to separate analyte ions according to their ion mobility;
to cause first ions of the analyte ions to be selected, and to cause the one or more collision, fragmentation or reaction devices to fragment or react the first ions to produce first product ions;
to cause the one or more ion mobility separators to separate the first product ions according to their ion mobility;
to determine an ion mobility pattern of the first product ions; and
to identify and/or characterise the first ions using the ion mobility pattern of the first product ions.

The spectrometer may comprise an ion source configured to generate the analyte ions.

The analyte ions may be polymeric. The first ions may be polymeric. The first product ions may be polymeric.

The analyte ions may be isomeric. The first ions may be isomeric. At least some of the first product ions may be isomeric.

The analyte ions may comprise isomeric polymeric analyte ions of a particular order, and the first product ions may comprise polymeric product ions of a plurality of different orders, each order of the plurality of different orders being less than the particular order of the isomeric polymeric analyte ions.

The polymeric product ions of one or more or each order of the plurality of different orders may comprise plural isomers.

The control system may be configured to determine the ion mobility pattern of the first product ions by:
determining, in respect of one or more or each order of the plurality of different orders, the number of isomers of that order that are present in the first product ions.

The control system may be configured to characterise the first ions using the ion mobility pattern of the first product ions by determining structural information of the first ions from the ion mobility pattern of the first product ions.

The control system may be configured to cause second ions of the analyte ions to be selected, and to cause the one or more collision, fragmentation or reaction devices to fragment or react the second ions to produce second product ions.

The control system may be configured to cause the one or more ion mobility separators to separate the second product ions according to their ion mobility or according to their rate of change of ion mobility with electric field strength.

The control system may be configured to determine an ion mobility pattern of the second product ions.

The control system may be configured to identify and/or characterise the first and/or second ions using the ion mobility pattern of the second product ions.

The control system may be configured to cause particular ions of the first product ions to be selected, and to cause the one or more collision, fragmentation or reaction devices to fragment or react the particular ions to produce second generation product ions.

The control system may be configured to cause the one or more ion mobility separators to separate the second generation product ions according to their ion mobility or according to their rate of change of ion mobility with electric field strength.

The control system may be configured to determine an ion mobility pattern of the second generation product ions.

The ion mobility pattern of the first product ions may include the ion mobility pattern of the second generation product ions.

The one or more ion mobility separators comprise a cyclic or closed-loop ion mobility separator.

According to an aspect there is provided a computer readable medium storing software code, which when executing on a processor, causes the processor to perform a method of identifying and/or characterising molecules, the method comprising:
determining an ion mobility pattern of first product ions, the first product ions being produced by separating analyte ions according to their ion mobility, selecting first ions of the analyte ions and fragmenting or reacting the first ions to produce the first product ions; and identifying and/or characterising the first ions using the ion mobility pattern of the first product ions.

Each of the aspects and embodiments described herein can, and in various embodiments do, include any one or more or all of the features described herein.

BRIEF DESCRIPTION OF THE DRAWINGS

Various embodiments of the present invention will now be described, by way of example only, and with reference to the accompanying drawings in which:

FIG. 8A shows a schematically an embodiment of a spectrometer comprising the IMS device, and FIG. 8B shows a potential energy diagram of the DC potentials that may be applied to the components of the spectrometer in a mode in which ions are being accumulated in the ion entry/exit device of the drift cell;

FIGS. 10A and 10B show DC potentials that may be applied to the spectrometer at a stage when the ions are driven out of the ion entry/exit device into the adjacent part of the IMS drift cell; and FIGS. 11A and 11B show DC potentials that may be applied to the spectrometer at a stage when the ions are ejected from the drift cell at the ion entry/exit device.

FIG. 12 illustrates an arrangement of stores associated with an array of an ion entry/exit device in embodiments;

FIG. 13A shows a hypothetical ion mobility spectrum for a CID-IMS experiment, FIG. 13B shows a hypothetical ion mobility spectrum for a IMS-CID-IMS ("IMS$^2$") experiment on the first precursor ion, FIG. 13C shows a hypothetical ion mobility spectrum for a IMS-CID-IMS ("IMS$^2$") experiment on the second precursor ion, FIG. 13D shows a hypothetical ion mobility spectrum for a IMS-CID-IMS ("IMS$^2$") experiment on the third precursor ion, and FIG. 13E shows a hypothetical ion mobility spectrum for a IMS-CID-IMS ("IMS$^2$") experiment on the fourth precursor ion;

FIG. 14A shows a hypothetical ion mobility spectrum for a IMS$^2$ experiment (as per FIG. 13C), FIGS. 14B and 14C show hypothetical ion mobility spectra for IMS$^3$ experiments in which first generation product ions are selectively dissociated followed by mobility separation of their product ions, and FIGS. 14D, 14E and 14F show hypothetical ion mobility spectra for IMS$^4$ experiments in which second generation product ions are selectively dissociated followed by mobility separation of their product ions;

DETAILED DESCRIPTION

Figure 1:
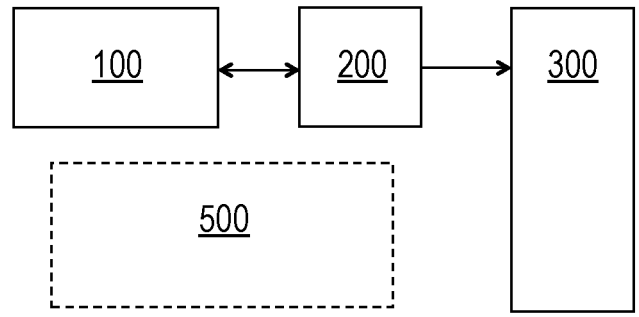
FIG. 1 shows schematically an analytical instrument according to various embodiments.

Various embodiments are directed to a method in which analyte ions are separated according to a first physico-chemical property (such as according to their ion mobility or according to their rate of change of ion mobility with electric field strength), first ions of the analyte ions are selected and activated, fragmented or reacted so as to produce first product ions, the first product ions are separated according to the first physico-chemical property, and a pattern of the first product ions is determined. The first ions are identified and/or characterised using the pattern of the first product ions.

In various particular embodiments, the first physico-chemical property comprises ion mobility.

Thus, various particular embodiments are directed to a method in which analyte ions are separated according to their ion mobility, first ions of the analyte ions are selected and activated, fragmented or reacted to produce first product ions, the first product ions are separated according to their ion mobility, and an ion mobility pattern of the first product ions is determined. The first ions are identified and/or characterised using the ion mobility pattern of the first product ions.

Although various embodiments herein are described primarily in terms of ion mobility, the first physico-chemical property may more generally comprise any suitable physico-chemical property of analyte molecules (or their ions) such as mass, mass to charge ratio, ion mobility, rate of change of ion mobility with electric field strength, chromatographic retention time, and the like (and, where appropriate, any one or more of these properties may be used in place of ion mobility in the embodiments described herein).

The method may comprise ionising an analyte to produce the analyte ions. The analyte ions may be ionised using any suitable ionisation source or technique, e.g. as described below.

The analyte may comprise polymeric molecules, such as a mixture of isomeric polymeric molecules. Correspondingly, the analyte ions may comprise ions of polymeric molecules, such as ions of a mixture of isomeric polymeric molecules. The polymeric molecules (polymers) may comprise molecules having a number of repeated subunits (monomers). The polymeric molecules (polymers) can be any suitable polymeric molecules, including for example synthetic polymers such as hydrocarbons, plastics, and the like; natural polymers or biopolymers such as proteins, carbohydrates, and the like.

The analyte ions may be separated according to the first physico-chemical property in any suitable manner. The analyte ions may be (and in various embodiments are) separated according to the first physico-chemical property such that analyte ions having different values of the first physico-chemical property arrive at an exit region of the separator at different times, for example such that ions with relatively high values of the first physico-chemical property arrive at the exit region ahead of ions with relatively low values of the first physico-chemical property (or such that ions with relatively low values of the first physico-chemical property arrive at the exit region ahead of ions with relatively high values of the first physico-chemical property).

The analyte ions may be separated according their rate of change of ion mobility with electric field strength using a high-field asymmetric waveform ion mobility (FAIMS) separator. The analyte ions may be separated according to their mass to charge ratio using a mass spectrometer (for example using a time of flight (ToF) mass analyser).

The analyte ions may be separated according to their chromatographic retention time using a chromatographic separator such as a liquid chromatography column or a gas chromatography separator. In this case, the analyte ions may be separated according to their chromatographic retention time by separating the analyte molecules from which the analyte ions are derived according to their chromatographic retention time. Thus, although in various particular embodiments, the step of separating the analyte ions according to the first physico-chemical property comprises separating the analyte ions according to the first physico-chemical property after the analyte ions have been generated, the step of separating the analyte ions according to the first physico-chemical property may instead comprise separating analyte molecules according to the first physico-chemical property before the analyte ions have been generated. In this latter case, separating the analyte molecules according to the first physico-chemical property may cause the analyte ions to be separated according to the first physico-chemical property when they are (subsequently) generated.

The analyte ions may be separated according their ion mobility using an ion mobility separator. Any suitable such ion mobility separator may be provided and used, e.g. as described below. The analyte ions should be (and in various embodiments are) separated according to their ion mobility such that analyte ions having different ion mobilities arrive at an exit region of the ion mobility separator at different times, e.g. such that ions with relatively high ion mobilities arrive at the exit region ahead of ions with relatively low ion mobilities (or such that ions with relatively low values of ion mobility arrive at the exit region ahead of ions with relatively high values of ion mobility).

First ions of the analyte ions are selected. The method may further comprise selecting second ions of the analyte ions. The method may comprise selecting third and/or further ions of the analyte ions.

Each of the first, second, third and/or further ions may have a particular value of the first physico-chemical property or (narrow) range of values of the first physico-chemical property. Each of the first, second, third and/or further values of the first physico-chemical property (or ranges) may be different. Each of the first, second, third and/or further ions may have a particular value of ion mobility or (narrow) range of ion mobilities. Each of the first, second, third and/or further ion mobility values (or ranges) may be different. The first, second, third and/or further ions may be isomers, e.g. isomeric ions of a polymeric molecule.

According to various embodiments, the first (and/or second and/or third and/or further) ions are selected on the basis of the first physico-chemical property. That is, analyte ions having a particular selected value of the first physico-chemical property or a particular selected (narrow) range of values of the first physico-chemical property are selected, that is, isolated from other ions that do not have (that other than have) the particular selected value of the first physico-chemical property or that have values of the first physico-chemical property falling outside the particular selected range of values.

According to various embodiments, the first (and/or second and/or third and/or further) ions are selected on the basis of their ion mobility. That is, analyte ions having a particular selected ion mobility or a particular selected (narrow) range of ion mobilities are selected, i.e. isolated from other ions that do not have (that other than have) the particular selected ion mobility or that have ion mobilities falling outside the particular selected range of ion mobilities. This may be achieved in any suitable manner, such as in the manner described below.

According to various embodiments, each of the first and/or second and/or third and/or further analyte ions is selected separately, for example in turn.

This may involve selecting first ions of the analyte ions that have a first value of the first physico-chemical property or a first range of values of the first physico-chemical property, then selecting second ions of the analyte ions that have a second different value of the first physico-chemical property or a second different range of values of the first physico-chemical property, then selecting third ions of the analyte ions that have a third different value of the first physico-chemical property or a third different range of values of the first physico-chemical property, then selecting further ions of the analyte ions that have a further different value of the first physico-chemical property or a further different range of values of the first physico-chemical property, and so on.

This may involve selecting first ions of the analyte ions that have a first ion mobility or a first range of ion mobilities, then selecting second ions of the analyte ions that have a second different ion mobility or a second different range of ion mobilities, then selecting third ions of the analyte ions that have a third different ion mobility or a third different range of ion mobilities, then selecting further ions of the analyte ions that have a further different ion mobility or a further different range of ion mobilities, and so on.

The selected first ions are activated, fragmented or reacted to produce first product ions, e.g. using an activation, fragmentation, collision or reaction device. The method may further comprise activating, fragmenting or reacting the second ions to produce second product ions, activating, fragmenting or reacting the third ions to produce third product ions, and/or (then) activating, fragmenting or reacting the further ions to produce further product ions, e.g. using the or an activation, fragmentation, collision or reaction device. This may be done separately, for example in turn, as described above.

This may involve activating, fragmenting or reacting the selected first ions, then activating, fragmenting or reacting the selected second ions, then activating, fragmenting or reacting the selected third ions, then activating, fragmenting or reacting the selected further ions, and so on.

The or each activation, fragmentation, collision or reaction device can comprise any suitable such device, e.g. as described below.

In various embodiments, the first product ions are separated according to the first physico-chemical property. The method may comprise separating the second product ions according to the first physico-chemical property, separating the third product ions according to the first physico-chemical property, and/or separating the further product ions according to the first physico-chemical property. This may be done separately, for example in turn, as described above.

In embodiments, the first product ions are separated according to their ion mobility. The method may comprise separating the second product ions according to their ion mobility, separating the third product ions according to their ion mobility, and/or separating the further product ions according to their ion mobility (e.g. separately, for example in turn, as described above).

This may involve separating the first product ions, then separating the second product ions, then separating the third product ions, then separating the further product ions, and so on.

The first product ions that are separated according to the first physico-chemical property should be (and in various embodiments are) product ions derived from the first ions, that is, product ions derived from the separated analyte ions. Equally, each of the second and/or third and/or further product ions that are separated according to the first physico-chemical property should be (and in various embodiments are) product ions derived respectively from each of the second and/or third and/or further ions, that is, product ions derived from the separated analyte ions. Thus, according to various embodiments, two (or more) stages of separation are used in series.

In embodiments, the first product ions that are separated according to their ion mobility are product ions derived from the first ions, i.e. product ions derived from the ion mobility separated analyte ions. Equally, each of the second and/or third and/or further product ions that are separated according to their ion mobility should be (and in various embodiments are) product ions derived respectively from each of the second and/or third and/or further ions, i.e. product ions derived from the ion mobility separated analyte ions. Thus, according to various embodiments, two (or more) stages of ion mobility separation are used in series.

The product ions should be (and in various embodiments are) separated according to the first physico-chemical property such that product ions having different values of the first physico-chemical property arrive at an exit region of a separator at different times, for example such that product ions with relatively high values of the first physico-chemical property arrive at the exit region ahead of product ions with relatively low values of the first physico-chemical property (or such that product ions with relatively low values of the first physico-chemical property arrive at the exit region ahead of product ions with relatively high values of the first physico-chemical property).

The first (and/or second and/or third and/or further) product ions may be separated according their rate of change of ion mobility with electric field strength using a high-field asymmetric waveform ion mobility (FAIMS) separator. The first (and/or second and/or third and/or further) product ions may be separated according to their mass to charge ratio using a time of flight (ToF) separator. The first (and/or second and/or third and/or further) product ions may be separated according to their chromatographic retention time using a chromatographic separator such as a liquid chromatographic column or a gas chromatography separator.

The first (and/or second and/or third and/or further) product ions may be separated according their ion mobility using an ion mobility separator. Any suitable such ion mobility separator may be provided and used, e.g. as described below. The product ions should be (and in various embodiments are) separated according to their ion mobility such that product ions having different ion mobilities arrive at an exit region of the ion mobility separator at different times, e.g. such that product ions with relatively high ion mobilities arrive at the exit region ahead of product ions with relatively low ion mobilities (or such that product ions with relatively low values of ion mobility arrive at the exit region ahead of product ions with relatively high values of ion mobility).

In various embodiments, the first (and/or second and/or third and/or further) product ions are separated using the same separator such as the same ion mobility separator that was used to separate the analyte ions. However, it would be possible to use a first separator such as a first ion mobility separator to separate the analyte ions and one or more second different separators such as one or more second different ion mobility separators to separate the first (and/or second and/or third and/or further) product ions, if desired.

The method may comprise detecting the first (and/or second and/or third and/or further) product ions and/or detecting ions derived from the first (and/or second and/or third and/or further) product ions, e.g. using an ion detector. This may comprise analysing the first (and/or second and/or third and/or further) product ions and/or analysing ions derived from the first (and/or second and/or third and/or further) product ions, e.g. using a mass analyser, i.e. so as to determine their mass to charge ratio. The detection (analysis) should (and in various embodiments does) retain information regarding the separation such as regarding the ion mobility separation of the first (and/or second and/or third and/or further) product ions, i.e. such that the detection (analysis) provides at least first physico-chemical property information (values) such as ion mobility information (values) of the first (and/or second and/or third and/or further) product ions (and/or ions derived from the first (and/or second and/or third and/or further) product ions), optionally together with mass to charge ratio information (values) of the first (and/or second and/or third and/or further) product ions (and/or ions derived from the first (and/or second and/or third and/or further) product ions).

The ion detector may comprise any suitable ion detector, e.g. as described below. The mass analyser may comprise any suitable mass analyser, e.g. as described below.

The method may comprise selecting particular product ions of the first (or second or third or further) product ions and activating, fragmenting or reacting the particular product ions to produce second generation product (granddaughter) ions, and separating the second generation product (granddaughter) ions according to the first physico-chemical property such as according to their ion mobility (and optionally determining a pattern such as an ion mobility pattern of the second generation product (granddaughter) ions). The method may comprise selecting particular ions of the second generation product (granddaughter) ions and activating, fragmenting or reacting the second generation product (granddaughter) ions to produce third generation product (great granddaughter) ions, and separating the third generation product (great granddaughter) ions according to the first physico-chemical property such as according to their ion mobility (and optionally determining a pattern such as an ion mobility pattern of the third generation product (great granddaughter) ions). The method may comprise one or more further iterations of this process.

In these embodiments, the particular ions may be selected on the basis of the first physico-chemical property. That is, ions having a particular selected value of the first physico-chemical property or a particular selected (narrow) range of values of the first physico-chemical property may be selected, that is, isolated from other ions that do not have (that other than have) the particular selected value of the first physico-chemical property or that have values of the first physico-chemical property falling outside the particular selected range of values of the first physico-chemical property.

In embodiments, the particular ions are selected on the basis of their ion mobility. That is, ions having a particular selected ion mobility or a particular selected (narrow) range of ion mobilities may be selected, i.e. isolated from other ions that do not have (that other than have) the particular selected ion mobility or that have ion mobilities falling outside the particular selected range of ion mobilities. This may be achieved in any suitable manner, such as in the manner described below. According to various embodiments, each of the particular (e.g. first and/or second and/or third and/or further) ions is selected in turn.

The selected ions may be activated, fragmented or reacted (to produce second, third or further generation product (granddaughter, great granddaughter, etc.) ions, e.g. using an activation, fragmentation, collision or reaction device.

The second or third or further generation product ions that are separated according to the first physico-chemical property such as according to their ion mobility should be (and in various embodiments are) product ions derived from the first (or second or third or further) product ions, i.e. product ions derived from the (ion mobility) separated product ions. Thus, according to various embodiments, three (or more) stages of separation such as three (or more) stages of ion mobility separation are used in series.

The second or third or further generation product ions may be separated according to the first physico-chemical property such as according to their ion mobility, e.g. as described elsewhere herein.

In these embodiments, the second or third or further generation product ions should be (and in various embodiments are) separated according to the first physico-chemical property such that second or third or further generation product ions having different values of the first physico-chemical property arrive at an exit region of the separator at different times, for example such that second or third or further generation product ions with relatively high values of the first physico-chemical property arrive at the exit region ahead of second or third or further generation product ions with relatively low values of the first physico-chemical property (or such that second or third or further generation product ions with relatively low values of the first physico-chemical property arrive at the exit region ahead of second or third or further generation product ions with relatively high values of the first physico-chemical property.

In embodiments, the second or third or further generation product ions are separated according to their ion mobility such that second or third or further generation product ions having different ion mobilities arrive at an exit region of the ion mobility separator at different times, e.g. such that second or third or further generation product ions with relatively high ion mobilities arrive at the exit region ahead of second or third or further generation product ions with relatively low ion mobilities (or such that second or third or further generation product ions with relatively low values of ion mobility arrive at the exit region ahead of second or third or further generation product ions with relatively high values of ion mobility).

In various embodiments, the second or third or further generation product ions are separated using the same separator such as the same ion mobility separator that was used to separate the analyte ions and/or product ions. However, it would be possible to use one or more different separators such as one or more different ion mobility separators to separate the second or third or further generation product ions, if desired.

The method may comprise detecting the second or third or further generation product ions and/or detecting ions derived from second or third or further generation product ions, e.g. using an ion detector. This may comprise analysing the second or third or further generation product ions and/or analysing ions derived from second or third or further generation product ions, e.g. using a mass analyser, i.e. so as to determine their mass to charge ratio. The detection (analysis) should (and in various embodiments does) retain information regarding the separation such as the ion mobility separation of the second or third or further generation product ions, i.e. such that the detection (analysis) provides at least first physico-chemical property information (values) such as ion mobility information (values) of the second or third or further generation product ions, optionally together with mass to charge ratio information (values) of the second or third or further generation product ions.

Figure 2:
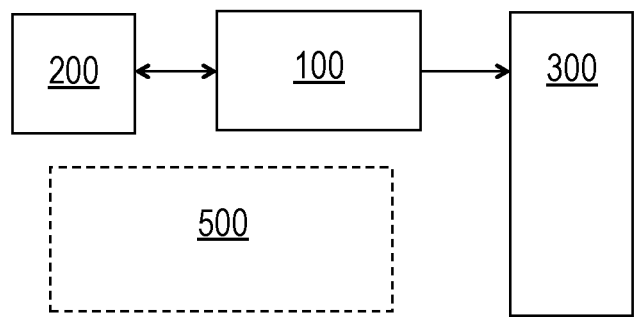
FIG. 2 shows schematically an analytical instrument according to various embodiments.
Figure 3:
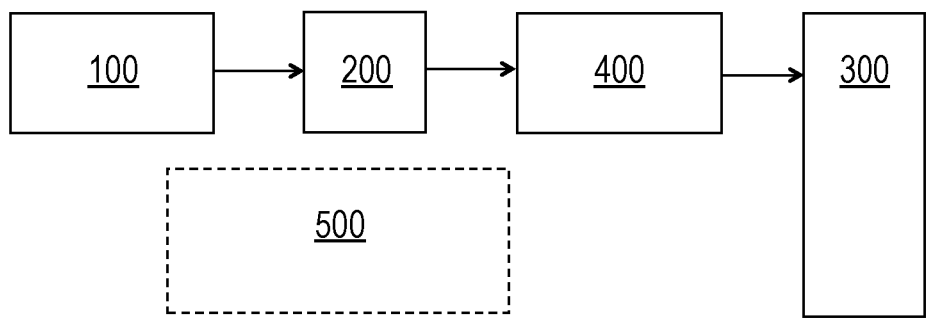
FIG. 3 shows schematically an analytical instrument according to various embodiments.

FIGS. 1, 2 and 3 show schematically an analytical instrument such as a mass and/or ion mobility spectrometer in accordance with various embodiments. The analytical instrument comprises a separator such as an ion mobility separator 100 coupled to an activation, collision, fragmentation or reaction device 200, which are upstream of (and coupled to) a mass analyser 300.

As illustrated by FIGS. 1 and 2, the analytical instrument may be configured such that ions can be provided by (sent from) the (ion mobility) separator 100 to the activation, collision, fragmentation or reaction device 200, and can be provided by (sent from) the activation, collision, fragmentation or reaction device 200 to the (ion mobility) separator 100. This allows fragment or product ions of (ion mobility) separated ions to be (ion mobility) separated.

Although FIG. 1 shows the (ion mobility) separator 100 being upstream of the activation, collision, fragmentation or reaction device 200 in the instrument geometry (relative to the mass analyser 300), as shown in FIG. 2 it would also be possible for the activation, collision, fragmentation or reaction device 200 to be upstream of the (ion mobility) separator 100 in the instrument geometry (relative to the mass analyser 300).

As illustrated by FIG. 3, the analytical instrument may alternatively comprise a second separator such as a second ion mobility separator 400, e.g. that is provided downstream from the activation, collision, fragmentation or reaction device 200 (and upstream from the mass analyser 300). This again allows fragment or product ions of (ion mobility) separated ions to be (ion mobility) separated.

It should be noted that FIGS. 1, 2 and 3 are merely schematic, and that the analytical instrument may (and in various embodiments does) include other components, devices and functional elements to those shown in FIGS. 1, 2 and 3.

In various embodiments, the analytical instrument comprises an ion source (not shown) e.g. configured to generate the analyte ions. The ion source may comprise any suitable ion source such as an ion source selected from the group consisting of: (i) an Electrospray ionisation ("ESI") ion source; (ii) an Atmospheric Pressure Photo Ionisation ("APPI") ion source; (iii) an Atmospheric Pressure Chemical Ionisation ("APCI") ion source; (iv) a Matrix Assisted Laser Desorption Ionisation ("MALDI") ion source; (v) a Laser Desorption Ionisation ("LDI") ion source; (vi) an Atmospheric Pressure Ionisation ("API") ion source; (vii) a Desorption Ionisation on Silicon ("DIOS") ion source; (viii) an Electron Impact ("EI") ion source; (ix) a Chemical Ionisation ("CI") ion source; (x) a Field Ionisation ("FI") ion source; (xi) a Field Desorption ("FD") ion source; (xii) an Inductively Coupled Plasma ("ICP") ion source; (xiii) a Fast Atom Bombardment ("FAB") ion source; (xiv) a Liquid Secondary Ion Mass Spectrometry ("LSIMS") ion source; (xv) a Desorption Electrospray Ionisation ("DESI") ion source; (xvi) a Nickel-63 radioactive ion source; (xvii) an Atmospheric Pressure Matrix Assisted Laser Desorption Ionisation ion source; (xviii) a Thermospray ion source; (xix) an Atmospheric Sampling Glow Discharge Ionisation ("ASGDI") ion source; (xx) a Glow Discharge ("GD") ion source; (xxi) an Impactor ion source; (xxii) a Direct Analysis in Real Time ("DART") ion source; (xxiii) a Laserspray Ionisation ("LSI") ion source; (xxiv) a Sonicspray Ionisation ("SSI") ion source; (xxv) a Matrix Assisted Inlet Ionisation ("MATI") ion source; (xxvi) a Solvent Assisted Inlet Ionisation ("SATI") ion source; (xxvii) a Desorption Electrospray Ionisation ("DESI") ion source; (xxviii) a Laser Ablation Electrospray Ionisation ("LAESI") ion source; (xxix) a Surface Assisted Laser Desorption Ionisation ("SALDI") ion source; (xxx) a Low Temperature Plasma ("LTP") ion source; and (xxxi) a Helium Plasma Ionisation ("HePI") ion source.

The analytical instrument may comprise a chromatography or other separation device upstream of (and coupled to) the ion source. The chromatography separation device may comprise a liquid chromatography or gas chromatography device. Alternatively, the separation device may comprise: (i) a Capillary Electrophoresis ("CE") separation device; (ii) a Capillary Electrochromatography ("CEC") separation device; (iii) a substantially rigid ceramic-based multilayer microfluidic substrate ("ceramic tile") separation device; or (iv) a supercritical fluid chromatography separation device.

The or each separator may comprise any suitable separator that is configured to separate ions according to a physico-chemical property such as mass, mass to charge ratio, ion mobility, rate of change of ion mobility with electric field strength, chromatographic retention time, and the like. In particular, the or each ion mobility separator 100, 400 may comprise any suitable ion mobility separator that is configured to separate ions according to their ion mobility.

The or each ion mobility separator 100, 400 may comprise a drift tube, e.g. that is pressurised with gas. An electric field, e.g. comprising a DC voltage gradient and/or a travelling DC voltage wave, may be arranged to urge ions along the length of the ion mobility separator 100, 400, i.e. through the gas, so that ions separate according to their ion mobility. The ions may optionally be urged against a counter flow of gas. Alternatively, a gas flow may be arranged to urge ions along the length of the ion mobility separator 100, 400, while an electric field, e.g. comprising a DC voltage gradient and/or a travelling DC voltage wave, may be arranged to oppose the gas flow so that ions separate according to their ion mobility.

The or each ion mobility separator 100, 400 may operate in-line with the ion optical path of the analytical instrument (e.g. mass spectrometer). However, various embodiments are particularly, although not exclusively, concerned with an ion mobility separation device comprising a closed-loop ion separator. The ion mobility separation device may include any or all of the features of the ion separation devices disclosed in U.S. Pat. No. 9,984,861, entitled "Ion Entry/Exit Device", in the name of Micromass UK Limited, the entire contents of which is incorporated herein by reference. Other examples of a cyclic ion mobility separator system, to which the method disclosed herein are applicable, are described in US 2009/014641 (Micromass), the entire contents of which are herein incorporated by reference.

Thus, in various particular embodiments, the ion mobility separator 100 comprises a cyclic (closed-loop) ion mobility separator. In these embodiments, ions may be caused to separate according to their ion mobility over e.g. a fixed integer number of cycles around the ion mobility separator 100. An ion gate or gate region may be provided which may be closed to allow multi-pass operation. The ion gate may be opened, e.g. after a predetermined time period, to allow ions to exit the ion mobility separator 100 after ions have made one or more circuits of the ion mobility separator 100. Using a cyclic ion mobility separator can allow a higher degree of separation, and so higher ion mobility resolution.

The ion mobility separation device may be operated in one or more of a plurality of modes of operation. In various embodiments, the modes of operation include at least an ion introduction e.g. injection mode, an ion separation mode and an ion ejection for data acquisition mode. Optionally the modes may further comprise a bypass mode in which ions bypass the separator of the ion mobility separation device. In this mode, the ions may pass through the ion mobility separation device without undergoing separation.

In various embodiments the ion mobility separation device further comprises at least one ion store for storing ions before and/or after passing through the separator. The or each ion store may be located immediately adjacent the separator. In some embodiments first and second ion stores are provided, which may be located one on either side of the separator. In embodiments the first and second stores are for storing ions which have passed through the separator. In some embodiments ions enter or leave the or each ion store along a path which is orthogonal to a direction of travel of ions along the separator of the ion mobility separation device. Such a store may enable ions to be temporarily stored before or after passing through the separator, before being reintroduced to the separator at a later time, or being ejected for detection. This functionality may enable certain ions e.g. having a particular range of mobility to be separated out from a sample of ions. Such ions may be selected by selecting the timing of the applicable instance of a mode appropriately. The stored ions may be the desired ions, such that they are subsequently ejected for data acquisition, optionally after further separation, or they may be the ions that it is desired to discard, such that they are ejected from the store so as to be discarded from further processing. The or each ion store may comprise a collision, fragmentation or reaction device, and when in a store, ions may be subjected to processing, such as activation or fragmentation.

In embodiments, the or each ion store is local to the separator of the ion separation device. For example, in embodiments, the separator comprises an array of electrodes, and the or each ion store is located immediately adjacent the array.

In embodiments in which the ion mobility separation device comprises at least one store, the modes may further comprise, in respect of one or more of the stores, at least one mode in which ions are introduced to the store, and at least one mode in which ions are ejected from the store. In embodiments, the modes may include a mode in which ions are introduced to the store after passing through the separator, and one or both of a mode in which ions are ejected from the store for detection and a mode in which ions are ejected from the store and reintroduced to the separator.

Yet further modes may be used, for example, to result in processing of stored ions. For example, the modes may include a mode in which ions stored in a store are subjected to at least one of fragmentation, reaction, dissociation and activation.

In embodiments the ion separator comprises is a cyclic separator i.e. a closed loop separator. The separator may comprise an ion guide, which may be a closed loop ion guide. The separator e.g. closed-loop ion guide may start and end with an ion entry/exit device. The ion entry/exit device may be provided by a region of a closed-loop ion guide. Features of embodiments of an ion entry/exit device which may be used in these embodiments are described below.

When the device is operating in a separation mode, ions may be caused to pass around the separator e.g. ion guide (and, where applicable, through an ion entry/exit device) a plurality of times, and as many times as desired. For example, the ions may pass around the separator e.g. ion guide, and, where applicable, through the ion entry/exit region ≥x times, wherein x is 2, 3, 4, 5, 6, 7, 8, 9, 10, 15 or 20.

In some embodiment the ion mobility separation device comprises an ion entry/exit device, and controlling the operation of the ion mobility separation device may comprise controlling the ion entry/exit device to implement a given function of the ion mobility separation device. The ion mobility separation device may comprise an ion entry/exit device having at least two arrays of electrodes. In some embodiments, the modes include a first mode in which DC potentials are successively applied to successive electrodes of at least one of the electrode arrays in a first direction such that a potential barrier moves along the at least one array in the first direction and drives ions into and/or out of the device in the first direction; and a second mode in which DC potentials are successively applied to successive electrodes of at least one of the electrode arrays in a second, different direction such that a potential barrier moves along the at least one array in the second direction and drives ions into and/or out of the device in the second direction.

Ions ejected from the separator may be ejected for detection (and hence data acquisition). In this case, ions may be ejected into an ion guide, ion trap, or ion processing device. The ions may pass through one or more components prior to detection.

Ions will separate according to their ion mobilities as they pass through the separator. Thus, switching between modes of the ion separation device at an appropriate time may be used to cause a desired subset of ions to be ejected from the separator e.g. for detection, or to an ion store as desired.

Ions ejected out of the ion separator may be ejected into an ion guide, ion store, ion trap, or ion processing device. The selectively ejected ions may be stored, mass analysed, fragmented to form fragment ions, or reacted with ions or molecules to form product ions within an ion store, ion guide, ion trap, or ion processing device. The ion separation device may be switched back to a separation mode once a desired subset of ions have been ejected. The ejected subset of ions may be a subset of ions having a first ion mobility, or first range of ion mobilities. Other ions having a second ion mobility, or second range of ion mobilities may be allowed to continue to pass through the separator. The method may comprise reintroducing the selectively ejected ions, fragment ions or product ions into the ion entry/exit device whilst operating the device in the second mode such that the reintroduced ions pass into the second ion guide again.

The activation, collision, fragmentation or reaction device 200 may comprise any suitable such device. The analytical instrument may comprise one or more activation, collision, fragmentation or reaction cells selected from the group consisting of: (i) a Collisional Induced Dissociation ("CID") fragmentation device; (ii) a Surface Induced Dissociation ("SID") fragmentation device; (iii) an Electron Transfer Dissociation ("ETD") fragmentation device; (iv) an Electron Capture Dissociation ("ECD") fragmentation device; (v) an Electron Collision or Impact Dissociation fragmentation device; (vi) a Photo Induced Dissociation ("PID") fragmentation device; (vii) a Laser Induced Dissociation fragmentation device; (viii) an infrared radiation induced dissociation device; (ix) an ultraviolet radiation induced dissociation device; (x) a nozzle-skimmer interface fragmentation device; (xi) an in-source fragmentation device; (xii) an in-source Collision Induced Dissociation fragmentation device; (xiii) a thermal or temperature source fragmentation device; (xiv) an electric field induced fragmentation device; (xv) a magnetic field induced fragmentation device; (xvi) an enzyme digestion or enzyme degradation fragmentation device; (xvii) an ion-ion reaction fragmentation device; (xviii) an ion-molecule reaction fragmentation device; (xix) an ion-atom reaction fragmentation device; (xx) an ion-metastable ion reaction fragmentation device; (xxi) an ion-metastable molecule reaction fragmentation device; (xxii) an ion-metastable atom reaction fragmentation device; (xxiii) an ion-ion reaction device for reacting ions to form adduct or product ions; (xxiv) an ion-molecule reaction device for reacting ions to form adduct or product ions; (xxv) an ion-atom reaction device for reacting ions to form adduct or product ions; (xxvi) an ion-metastable ion reaction device for reacting ions to form adduct or product ions; (xxvii) an ion-metastable molecule reaction device for reacting ions to form adduct or product ions; (xxviii) an ion-metastable atom reaction device for reacting ions to form adduct or product ions; and (xxix) an Electron Ionisation Dissociation ("EID") fragmentation device.

The mass analyser 300 may comprise an orthogonal acceleration Time of Flight mass analyser. However, more generally the mass analyser may comprise any suitable mass analyser such as a mass analyser selected from the group consisting of: (i) a quadrupole mass analyser; (ii) a 2D or linear quadrupole mass analyser; (iii) a Paul or 3D quadrupole mass analyser; (iv) a Penning trap mass analyser; (v) an ion trap mass analyser; (vi) a magnetic sector mass analyser; (vii) Ion Cyclotron Resonance ("ICR") mass analyser; (viii) a Fourier Transform Ion Cyclotron Resonance ("FTICR") mass analyser; (ix) an electrostatic mass analyser arranged to generate an electrostatic field having a quadro-logarithmic potential distribution; (x) a Fourier Transform electrostatic mass analyser; (xi) a Fourier Transform mass analyser; (xii) a Time of Flight mass analyser; (xiii) an orthogonal acceleration Time of Flight mass analyser; and (xiv) a linear acceleration Time of Flight mass analyser.

The analytical instrument may comprise any one or more further devices, as desired. For example, in various embodiments, the analytical instrument may comprise one or more ion guides, one or more ion traps, and/or one or more mass filters, e.g. which may be selected from the group consisting of: (i) a quadrupole mass filter; (ii) a 2D or linear quadrupole ion trap; (iii) a Paul or 3D quadrupole ion trap; (iv) a Penning ion trap; (v) an ion trap; (vi) a magnetic sector mass filter; (vii) a Time of Flight mass filter; and (viii) a Wien filter.

As shown in FIGS. 1, 2 and 3, the analytical instrument may comprise a control system 500, e.g. that is configured to control the operation of the analytical instrument, e.g. in the manner of the various embodiments described herein. The control system may comprise suitable control circuitry that is configured to cause the instrument to operate in the manner of the various embodiments described herein. The control system may comprise suitable processing circuitry configured to perform any one or more or all of the necessary processing and/or post-processing operations in respect of the various embodiments described herein. In various embodiments, the control system may comprise a suitable computing device, a microprocessor system, a programmable FPGA (field programmable gate array), and the like.

The analytical instrument may be operated in various modes of operation including a mass spectrometry ("MS") mode of operation; a tandem mass spectrometry ("MS/MS") mode of operation; a mode of operation in which parent or precursor ions are alternatively fragmented or reacted so as to produce fragment or product ions, and not fragmented or reacted or fragmented or reacted to a lesser degree; a Multiple Reaction Monitoring ("MRM") mode of operation; a Data Dependent Analysis ("DDA") mode of operation; a Data Independent Analysis ("DIA") mode of operation a Quantification mode of operation or an Ion Mobility Spectrometry ("IMS") mode of operation.

In operation, (parent or precursor) analyte ions from the ion source may be introduced into the (ion mobility) separator 100, whereupon the ions may be caused to separate according to the first physico-chemical property such as according to their ion mobility, e.g. as they pass through the (ion mobility) separator 100.

Selected (isolated) ions may then be introduced into the activation, collision, fragmentation or reaction device 200. The activation, collision, fragmentation or reaction device 200 may be operated in an activation, fragmentation or reaction mode whereby ions are activated, fragmented or reacted to produce product ions.

In embodiments in accordance with FIGS. 1 and 2, product ions may then be reintroduced into the (ion mobility) separator 100, whereupon the product ions may be caused to separate according to the first physico-chemical property such as according to their ion mobility, e.g. as they pass through the (ion mobility) separator 100. These separated product ions may then be passed to the mass analyser 300 for analysis (optional via the activation, collision, fragmentation or reaction device 200 (in embodiments in accordance with FIG. 1), which may be operated in a non-activating, fragmenting or reacting mode whereby ions are not activated, fragmented or reacted, or which may be operated in an activation, fragmentation or reaction mode whereby product ions are activated, fragmented or reacted to produce granddaughter ions).

In embodiments in accordance with FIG. 3, product ions may be introduced into the second (ion mobility) separator 400, whereupon the product ions may be caused to separate according to the first physico-chemical property such as according to their ion mobility, e.g. as they pass through the second (ion mobility) separator 400. These separated product ions may then be passed to the mass analyser 300 for analysis.

Ions within the mass analyser 300 may be separated according to their mass to charge ratio (time of flight).

In this manner, analyte ions may be separated according to the first physico-chemical property such as according to their ion mobility, first (second, third, further, etc.) ions of the analyte ions may be selected and activated, fragmented or reacted to produce first product ions, and the first product ions may be separated according to the first physico-chemical property such as according to their ion mobility.

FIGS. 4-12 illustrate a particular example of an ion mobility separator (IMS) device to which the methods described herein may be applied. The embodiments of the IMS device shown in FIGS. 4-12 are as described in U.S. Pat. No. 9,984,861 (Micromass), previously incorporated herein by reference. It will be appreciated that the methods described herein are not limited to use with this type of IMS device. For example, the IMS device need not be a closed loop IMS device. If the IMS device is a closed loop device, it need not be of the construction described in U.S. Pat. No. 9,984,861 e.g. including the particular ion exit/entry device. Other types of cyclic IMS device are described in the aforementioned US 2009/014641 (Micromass), which is herein incorporated by reference, and in US 2007/0076926 (Micromass), the entire contents of which is incorporated herein by reference. US 2017/0076926 (Micromass) describes techniques for performing mass spectrometry on ions eluting from an IMS device.

Figure 4A:
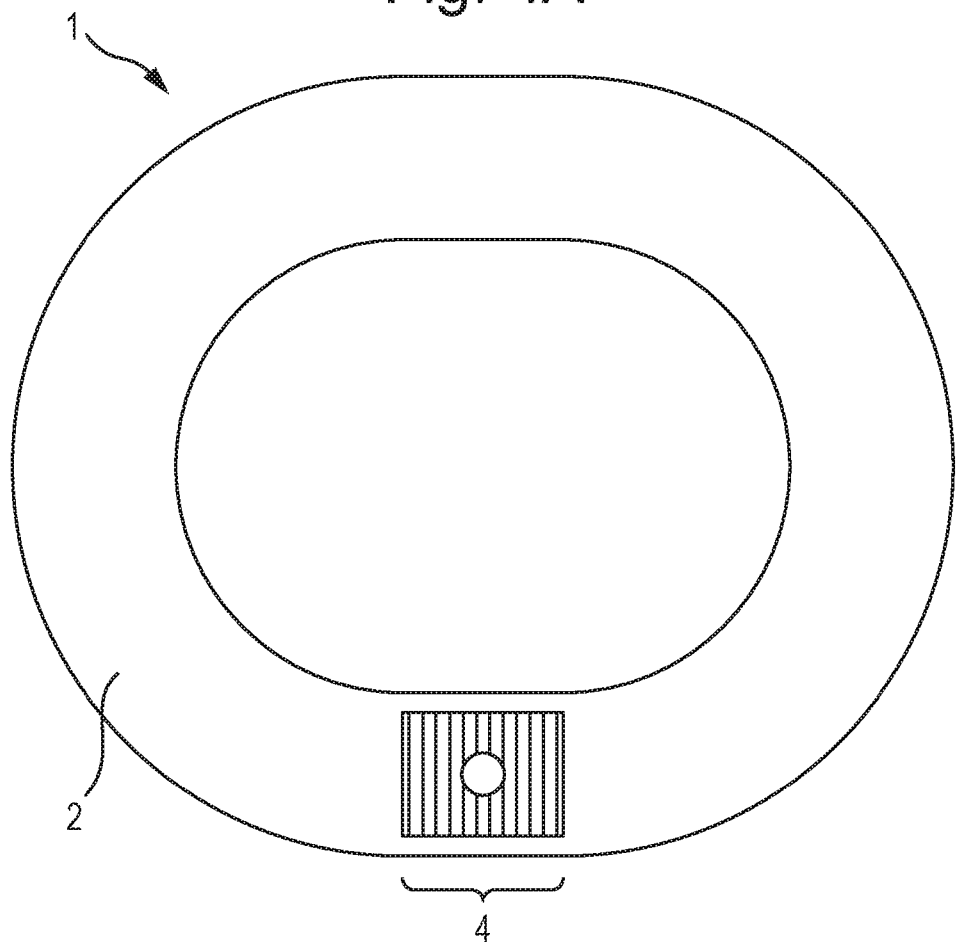
FIG. 4A shows schematically a front view of an ion mobility separator (IMS) device according to an embodiment.

FIG. 4A shows a front schematic view of an ion mobility separator (IMS) device according to embodiments. The IMS device 1 comprises a closed-loop drift cell 2 around which the ions are guided in use. The drift cell 2 comprises a plurality of electrodes that act to confine the ions to an axial path that extends around the closed-loop drift cell 2. The drift cell 2 also comprises electrodes that urge the ions along the axial length of the drift cell. The ion guide is filled with a background gas such that as the ions are urged around the drift cell 2 they collide with the gas molecules and separate according to their ion mobilities through the gas. The ions may be urged around the closed-loop drift cell 2 once or multiple times before being extracted through an exit region 4. The ions may be urged around the drift cell 2 by applying one or more electrical potential that travels axially along the drift cell 2, or by a static DC potential gradient that is arranged axially along the drift cell 2.

Figure 4B:
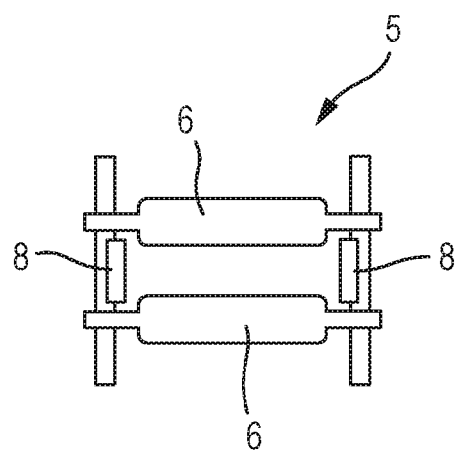
FIG. 4B shows a cross-sectional side view of a portion of the drift cell of the IMS device of FIG. 4A, and FIGS. 4C and 4D show different views of the embodiment of FIG. 4A.

FIG. 4B shows a cross-sectional side view of a portion of the drift cell 2 of the IMS device of FIG. 4A. FIG. 4B shows an embodiment of an electrode unit arrangement 5 that may be used to confine ions to the axis of the ion guiding path in the drift cell 2. At a given point along the axial length of the ion guiding path, the path may be defined between two RF electrodes 6 that are spaced apart in a first direction and two DC electrodes 8 that are spaced in a second, optionally orthogonal, direction. RF voltages are applied to the RF electrodes 6 so as to confine the ions between the RF electrodes 6, in the first direction. DC voltages are applied to the DC electrodes 8 so as to confine the ions between the DC electrodes 8, in the second direction.

The electrode unit 5 is repeated along the axial length of the drift cell 2 such that ions are confined in the drift cell 2 at all points around the ion guide, except when ions are ejected from the ion entry/exit region 4, which will be described further below. The electrode units 5 are axially spaced along the ion guiding path and one of more DC potential may be successively applied to successive electrode units 5 such that a travelling DC potential travels around the drift cell 2 and hence forces the ions around the drift cell. Alternatively, different DC potentials may be applied to successive electrode units 5 around the ion guide such that a static DC gradient is applied along the axis that forces the ions around the drift cell 2.

The upper and lower sides of the drift cell 2 may be formed from printed circuit boards having the DC or RF electrodes 6, 8 arranged thereon. Alternatively, or additionally, the radially inner and outer sides of the drift cell 2 may be formed from printed circuit boards having the RF or DC electrodes 6, 8 arranged thereon.

Figure 4C:
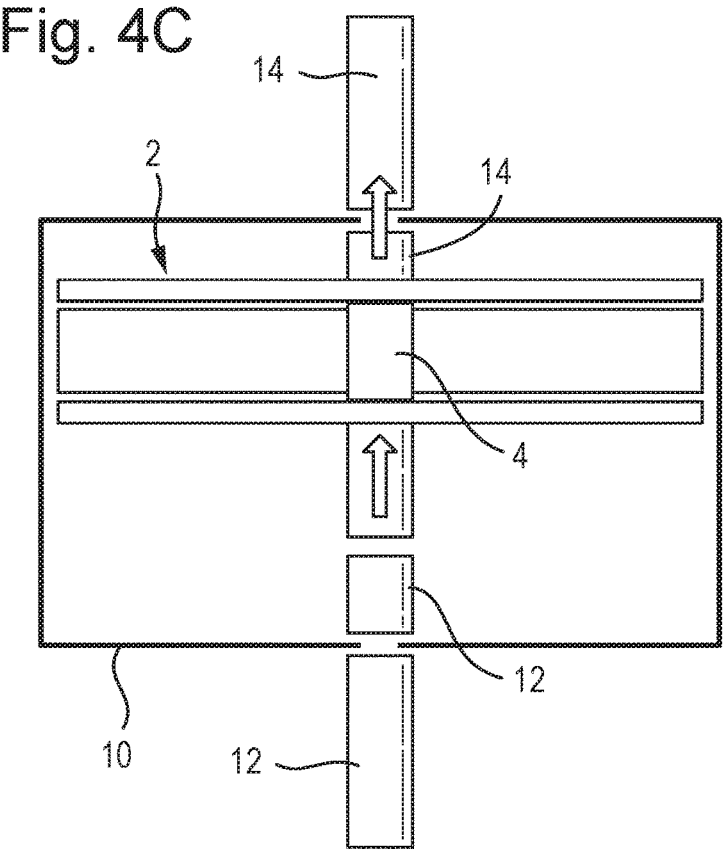
Figure 4D:
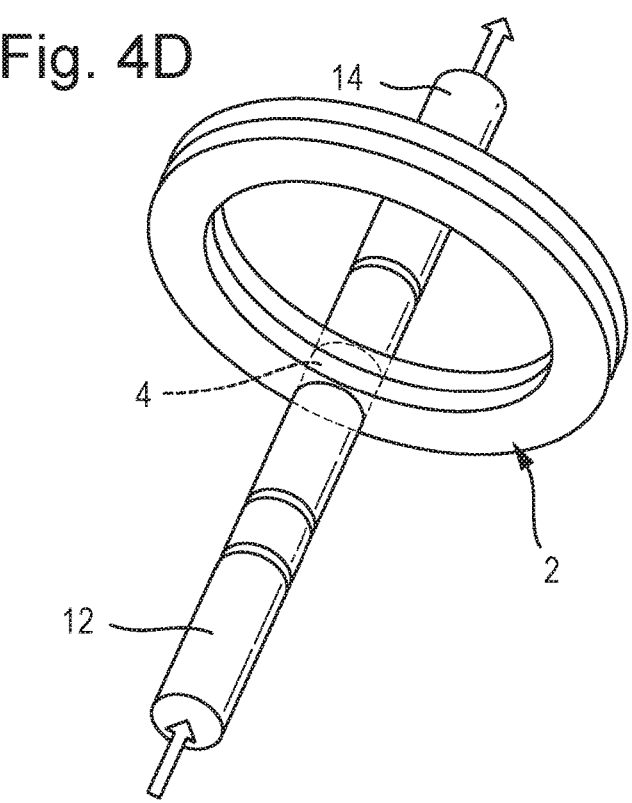

FIG. 4C and FIG. 4D show an orthogonal view and a perspective view of the embodiment of FIG. 4A respectively. The drift cell 2 is arranged inside a chamber 10 that is filled with drift gas. Ions are guided into and out of the chamber 10 using RF ion guides 12, 14. The RF ion guides 12, 14 are also coupled with the ion entry/exit region 4 of the drift cell 2 such that ions can be guided into the drift cell 2 and out of the drift cell 2. In this embodiment, ions are guided into the chamber 10 and into the entry/exit region 4 of the drift cell 2 by input ion guides 12. If the ions are desired to be separated by their ion mobility then the ions are urged in an orthogonal direction to the ion entry direction and are urged around the oval, circular or racetrack ion path of the drift cell 2 e.g. when the ion entry/exit device 4, and hence the ion mobility separation device comprising the ion entry/exit device 4 is operated in an ion separation mode. As the ions pass along the ion path they separate according to their ion mobility through the drift gas that is present in the chamber 10 and hence the drift cell 2. When ions are desired to be extracted from the drift cell 2 e.g. when the ion entry/exit device 4 and hence the ion mobility separation device, is operated in an eject for detection mode, they are ejected in a direction towards the exit RF ion guides 14. The ions are then guided out of the chamber 10 by the exit ion guides 14.

On the other hand, if ion mobility separation of the ions is not required then ion species can be caused to pass from the input ion guide 12 to the output ion guide 14 directly through the entry/exit region 4 of the drift cell 2 and without passing around the drift cell 2. In other words, the ion entry/exit device 4, and hence the ion mobility separation device, may be operated in a by-pass mode.

In embodiments, it is possible to extract ions having a desired range of ions mobilities from the drift cell 2. This is achieved by causing ions to traverse around the drift cell 2 so that they separate and then synchronising the activation of one or more ejection voltages at the ion entry/exit region 4 with the time at which the ions of interest are at the entry/exit region 4. This may be achieved by timing a transition between separation and eject for detection modes appropriately. The desired ions are therefore ejected from the drift cell 2 and the other ion species remaining in the drift cell 2 can continue to pass through the drift cell 2 and separate according to ion mobility. Alternatively, the remaining ions may be discarded from the drift cell 2, for example, by removal of the RF voltages from the electrodes 6 such that the ions are no longer confined within the drift cell 2.

The ejected ions having the desired ion mobilities can be immediately transported away from the drift cell 2 to a detector, optionally first passing through a mass analyser. This may occur if an eject for detection mode is specified. Alternatively, if an eject for storage mode is specified, such ions may be trapped in an ion store whilst the next mobility cycle occurs in the drift cell 2 and until more ions of the same ion mobility range are ejected from the drift cell 2 into the ion store. An embodiment including first and second ion stores is described by reference to FIG. 9. After sufficient mobility cycles have been performed to accumulate the desired number of ions in the ion store, these ions may then be ejected for detection (when an appropriate mode of the IMS device is specified), optionally being transported to an analyser for further analysis prior to detection. This method may be used to increase the ion signal of the desired ions. Additionally, or alternatively, if an appropriate mode of the IMS device is specified, the desired ions that have been ejected from the drift cell 2 may be fragmented, activated or dissociated. A further injection mode followed by a separation mode may then be specified to result in the ions being reintroduced back into the drift cell such that the ion mobilities of the fragment, activated or product ions can be analysed by the drift cell 2.

Figure 5:
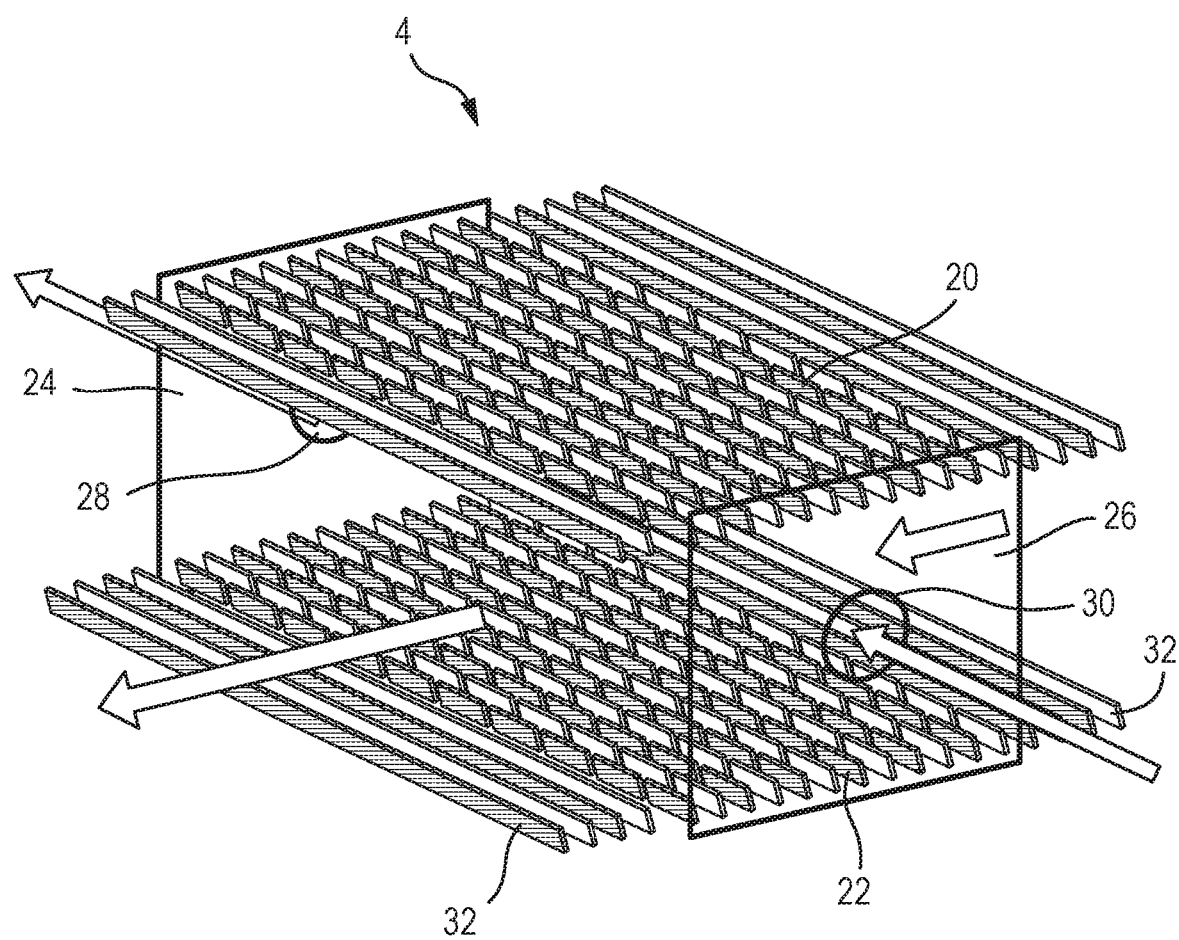
FIG. 5 shows schematically a perspective view of an embodiment of the ion entry/exit device of the drift cell.

FIG. 5 shows a schematic perspective view of an embodiment of the ion entry/exit device 4 of the drift cell 2. The ion entry/exit device 4 comprises two parallel, rectangular arrays of electrodes 20, 22 that are spaced apart from each other. Each array of electrodes 20, 22 comprises a plurality of electrodes arranged in rows and columns. Various electrical potentials are applied to these electrodes so as to manipulate the ions, as will be described in more detail below. The device has four sides that extend between the four edges of the arrays 20, 22. Two of the opposing sides are formed by end plates 24, 26, wherein each end plate has an orifice 28, 30 therein. One of the end plates 26 has an ion injection orifice 30 for injecting ions into the device 4 from outside of the drift cell 2. The opposing end plate 24 has an ion ejection orifice 28 for ejecting ions out of the device 4 and the drift cell 2. The other two opposing sides are junctions with the drift electrodes 32 of the main drift cell 2. One of the junctions, the entrance junction, allows ions to pass into the device 4 from within another part of the drift cell 2. The other junction, the exit junction, allows ions to pass out of the device 4 and into another part of the drift cell 2.

RF electrical potentials are applied to the electrodes in the arrays of electrodes 20, 22 in order to confine ions in the direction between the arrays 20, 22. The same phase RF potential may be applied to all of the electrodes in the same column of electrodes (a column extends in the direction between the end plates 24, 26 having orifices 28, 30). Adjacent columns of electrodes may be maintained at different RF phases, optionally opposite RF phases. However, it is alternatively contemplated that same phase RF potential may be applied to all of the electrodes in the same row (a row extends in the direction parallel to the apertured plates 24, 26). Adjacent rows of electrodes may be maintained at different RF phases, optionally opposite RF phases.

It will be seen that the ion entry/exit device 4 has plurality of modes of operation which may be used to implement modes of operation of the IMS device. Each such mode may be used to implement a given function in respect of ions, such that an experiment may be constructed from a sequence of modes of operation of the IMS device with appropriate timings. According to a first mode of operation the device 4 is operated in a manner that injects or loads ions into the device 4 from outside of the drift cell 2. The device 4 may also be operated in another mode that urges ions out of the ion entry/exit device 4 into an adjacent part of the drift cell 2. The device 4 may also be operated in another mode which ejects ions out of the device 4 to a region outside of the drift cell 2. These modes will now be described with reference to FIGS. 6 and 7.

Figure 6:
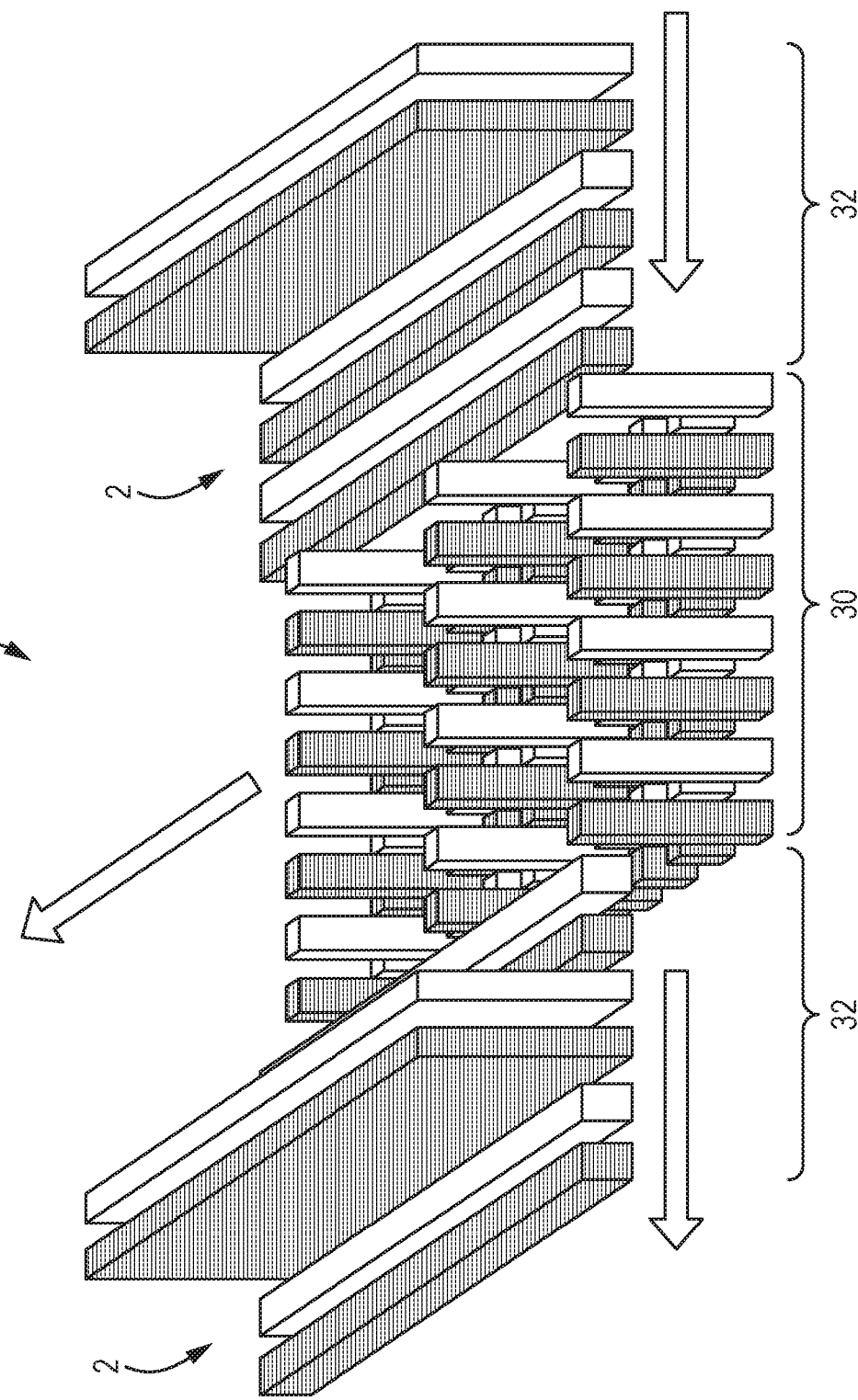
FIG. 6 shows schematically electrical potentials that may be applied to the ion entry/exit device during a mode in which ions are injected/loaded into the entry/exit device from outside of the drift cell.

FIG. 6 shows schematically electrical potentials that may be applied to the ion entry/exit device 4 and the adjacent parts of the drift cell 2 on either side of the device 4 during a mode in which ions are injected/loaded into the entry/exit device 4 from outside of the drift cell 2. The array of dark and light vertical bars 30 represent the potentials applied to either or both of the electrode arrays 20, 22 in the ion entry/exit device 4. The colours of the vertical bars 30 represent the RF phases applied to the electrodes in the arrays 20, 22, e.g. light coloured vertical bars represent one RF phase and dark coloured RF bars represent the opposite RF phase. The vertical heights of the vertical bars 30 represent the magnitudes of the DC voltages applied to the electrodes in the array(s) 20, 22. It can be seen that relatively high amplitude DC potentials are applied to all of the electrodes in some of the rows of electrodes, and that relatively low amplitude DC potentials are applied to all of the electrodes in the adjacent rows of electrodes. During the mode in which ions are injected/loaded into the device 4, the DC potentials applied to the electrodes in the arrays 20, 22 are varied with time such that the high DC voltages are successively applied to successive rows of electrodes in a direction from the ion injection orifice 30 towards the ion ejection orifice 28, and such that DC potential barriers travel in the direction from the ion injection orifice 30 towards the ion ejection orifice 28. Simultaneously, the low DC voltages are successively applied to successive rows of electrodes in a direction from the ion injection orifice 30 towards the ion ejection orifice 28. This causes ions to be forced into the ion entry/exit device 4 by the high amplitude DC voltages, wherein the ions travel in the regions of low DC voltages. The end plate having the exit orifice 28 may be maintained at a DC or RF potential such that ions are prevented from exiting the ion entry/exit device 4 during loading/injection of ions. Alternatively, or additionally, the amplitude of the high DC potentials may decrease as they travel in the direction towards the exit orifice 28. Alternatively, or additionally, a row of electrodes proximal to the exit orifice 28 may be maintained at high DC potentials so that the ions cannot be forced past this row and out of the ion entry/exit device 4 during loading.

The horizontally elongated bars 32 in FIG. 6 represent the potentials of electrodes in regions of the drift cell 2 that are adjacent to the ion entry/exit device 4. The colours of these horizontal bars represent the RF phases applied to the electrodes, e.g. light-coloured bars represent one RF phase and dark-coloured bars represent the opposite RF phase. The vertical heights at which the horizontally elongated bars 32 are located represent the magnitudes of the DC voltages applied to the electrodes. As can be seen, most of the horizontally elongated bars 32 are at a relatively low DC potential, but some of these bars are at a higher DC potential. These higher DC potentials are successively applied to successive electrodes along the axial length of the drift cell 2 so that a DC potential barrier travels along the axial length of the drift cell 2 and drives ions around the drift cell 2, which will be described in more detail in relation to FIG. 7. The aperture plates 24, 26 may have high and low DC voltages applied, respectively.

Referring again to FIG. 7, the vertical heights at which the upper surfaces of the horizontally elongated bars 32 are located represent the magnitudes of the DC voltages applied to the electrodes. It can be seen that the magnitude of the low DC potentials applied to the electrode arrays 20, 22 during ion loading/injection is smaller than the DC potentials at which the axially adjacent regions of the drift cell 2 is maintained. As such, the ions are prevented from passing from the ion entry/exit region 4 into the adjacent regions of the drift cell 2 during the ion loading/injection mode. This may implement an ion introduction/injection mode of the IMS device.

Once the ions have been loaded/injected into the ion entry/exit device 4, all of the electrodes in the array 20, 22 may be maintained at the relatively low DC potential, i.e. there is no longer a need to drive ions in the direction between the end plates 24, 26 having the orifices 28, 30 and so the high DC potentials may be replaced by low DC potentials. The two end plates 24, 26 may be maintained at DC or RF potentials that prevent ions from exiting through the end plates 24, 26. The DC potentials applied to the end plates 24, 26 may match the DC potential of the electrode 8. The DC potentials applied to the electrodes in the arrays 20, 22 may then be increased to the same value as the low DC potentials of the axially adjacent regions of the drift cell 2. There is then no DC barrier between the ion entry/exit region 4 and the axially adjacent portions of the drift cell 2. As such, ions may then pass easily from the ion entry/exit device 4 into the adjacent portion of the drift cell 2 so as to be separated according to their ion mobilities, as will be described with reference to FIG. 7. This may implement a separation mode of the IMS device.

Figure 7:
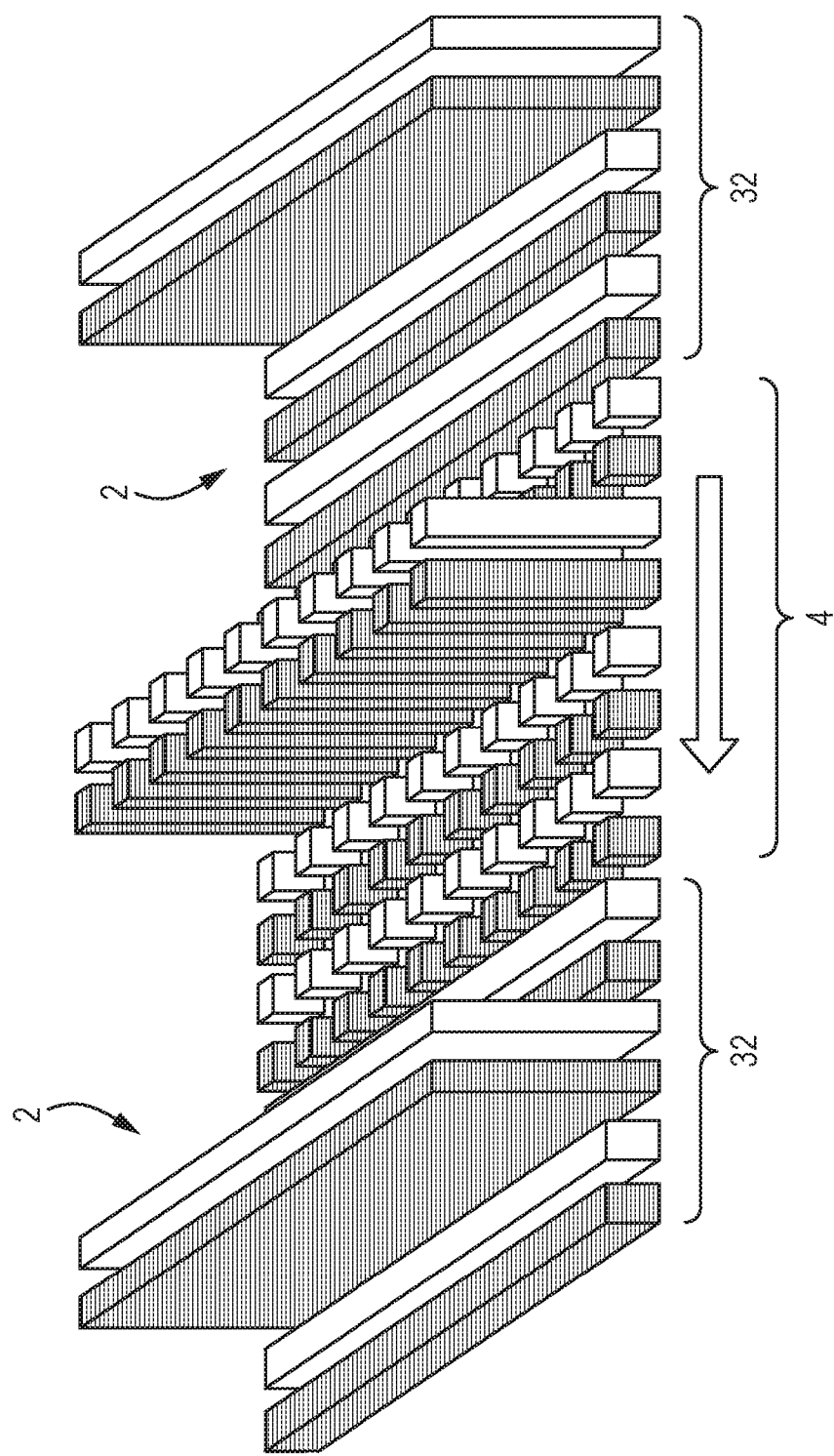
FIG. 7 shows schematically electrical potentials that may be applied to the ion entry/exit device during a mode in which ions are driven out of the ion entry/exit region and into the adjacent part of the drift cell.

FIG. 7 shows the electrical potentials that are applied to the ion entry/exit device 4 and the axially adjacent parts of the drift cell 2 during a mode in which ions are driven out of the ion entry/exit region 4 and into the adjacent part of the drift cell 2. As described above, after ions have been loaded/injected into the ion entry/exit device 4 the DC potentials applied to the arrays of electrodes 20, 22 are raised to correspond to the DC potentials of the adjacent parts of the drift cell 2. As such, there is no longer a DC barrier between the ion entry/exit device 4 and the adjacent parts of the drift cell. As shown in FIG. 4, the DC potentials applied to two columns of electrodes in the electrode arrays 20, 22 are then increased to high DC voltages relative to the other electrodes in the arrays 20, 22. These high DC voltages are successively applied to successive columns in the arrays 20, 22 such that the high DC voltages move along the arrays in the axial direction of the drift cell 2, as indicated by the arrow in FIG. 7. This causes the ions to be driven out of the ion entry/exit device 4 and through the exit junction. The ions then pass into the axially adjacent portion of the drift region 2. The high DC voltages that drove the ions out of the ion entry/exit device 4 may then be successively applied to successive electrodes along the axial length of the remainder of the drift region 2 so as to continuously drive the ions around the entire drift region 2. Examples of such voltages are shown by the relatively high horizontally elongated bars in FIG. 7.

The ions are driven around the closed-loop drift cell 2 by the travelling DC voltages and back into the ion entry/exit device 4 through the entrance junction. The ions may be ejected from the drift cell 2 at this point, as will be described in more detail below. Alternatively, the ions may again be driven through the ion entry/exit device 4 by applying the travelling DC potentials to the columns of electrodes in the electrode arrays 20, 22 and then driven around the drift cell 2 by the travelling DC potentials applied to the remainder of the drift cell electrodes. The ions may be driven around the drift cell 4 by this process as many times as is desired, until the ions have separated according to their ion mobility as desired. In this mode, the translation of the high DC potentials that drive ions through the ion entry/exit device 4 and into the axially adjacent part of the drift region 2 is optionally synchronised with the translation of the high DC potentials around the rest of the drift region. As such, the ion entry/exit region 4 is substantially ion-optically identical to the remainder of the drift region 2 during the mode of operation in which the ions are translated around the closed-loop drift cell a plurality of times.

When it is desired to eject ions from the drift cell, the DC potentials applied to the arrays of electrodes 20, 22 in the ion entry/exit region 4 may be lowered again relative to the adjacent parts of the drift cell 2 as shown in FIG. 6. This may implement an ion ejection mode of the IMS device e.g. for detection. DC potentials may then be applied to the arrays of electrodes 20, 22 so as to drive ions in the direction from the injection orifice 30 of the injection end plate 26 to the ejection orifice 28 of the ejection end plate 24. Aperture plates 24, 26 may have low and high DC voltages applied respectively. This is performed in the same manner as the ion loading/ejection mode of FIG. 6, except that in the ejection mode there is no potential barrier preventing the ions exiting the ion entry/exit device through the ejection orifice 30 of the ejection end plate 26. It will be appreciated that alternatively the ions could be ejected from the ion entry/exit device 4 through the same orifice 30 that they were loaded/injected by translating the high DC potentials in the opposite direction to the loading/injection direction.

The ion entry/exit region 4 may operate in a bypass mode in which ions are not desired to be driven around the closed-loop drift cell 2, and in which the ions are not caused to separate. This mode is the same as that described in relation to FIG. 3, except that the ions simply pass directly from the entrance orifice 30 and out of the exit orifice 28 without being transmitted orthogonally into the axially adjacent portion of the drift cell 2. The aperture plates 24, 26 may both have low DC voltages applied, respectively. This may implement a bypass mode of the IMS device. The ions may be prevented from passing into the axially adjacent portion of the closed-loop drift cell 2 by the DC potentials on the electrodes arrays 20, 22 being lower than those of the adjacent parts of the drift cell 2. The ions may or may not be driven through the ion entry/exit region 4 by the high DC potentials described in relation to FIG. 6.

FIG. 8A shows schematically a side view of an embodiment of a spectrometer comprising the IMS device. The spectrometer comprises a drift gas chamber 10, an ion trap 40, a helium cell 42, an ion accumulation cell 44, the IMS device 2, an exit cell 46 and an ion transfer cell 48. Electrode gates 50-58 are arranged between the above described successive components. In particular, an entrance gate 54 is arranged upstream of the ion entry/exit device 4 and an exit gate 56 is arranged downstream of the ion entry/exit device 4. The IMS device 2 corresponds to that shown in FIG. 4C.

FIG. 8B shows a potential energy diagram of the DC potentials applied to the components of the spectrometer in a mode in which ions are being accumulated in the ion entry/exit device 4 of the drift cell 2. Ions are released from the ion trap 40 and are then driven through the helium cell 42 by an axial electric field. The ions then pass through the ion accumulation cell 44 and into the ion entry/exit device 4 through the ion entrance orifice 30 in the entrance end plate 26 described above in relation to FIG. 5. The DC potentials of the electrodes in the electrode arrays 20, 22 of the ion entry/exit device 4 are maintained lower than the DC potentials applied to the accumulation cell 44, the entrance gate 54 and the exit gate 56. As such, ions are axially trapped and accumulate in the ion entry/exit device 4. The ions enter the ion entry/exit device 4 through the entrance orifice 30 of the entrance end plate 26 described above in relation to FIG. 5. A travelling DC wave may be applied to the rows of electrodes in the electrode arrays 20, 22 in order to urge ions into the ion entry/exit device 4, as described with reference to FIG. 6. The DC potential of the IMS drift cell 2 (excluding the ion entry/exit device 4) is represented by the horizontal line that is parallel and vertically above the line representing the DC voltage applied to the arrays 20, 22 of the ion entry/exit device 4. The potential difference represented by the gap between these two lines prevents ions from passing out of the ion entry/exit device 4 and into the axially adjacent parts of the IMS drift cell 2.

Figure 9A:
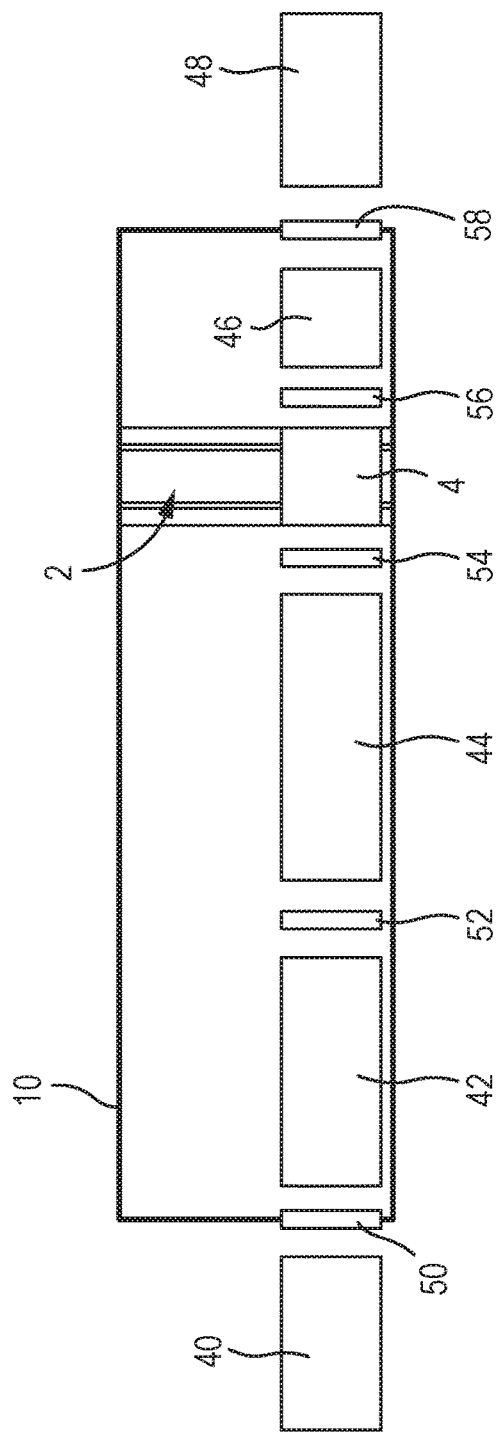
FIGS. 9A and 9B show how the potentials applied to the spectrometer may be altered in preparation for moving ions from the ion entry/exit device into the axially adjacent part of the IMS drift cell.
Figure 9B:
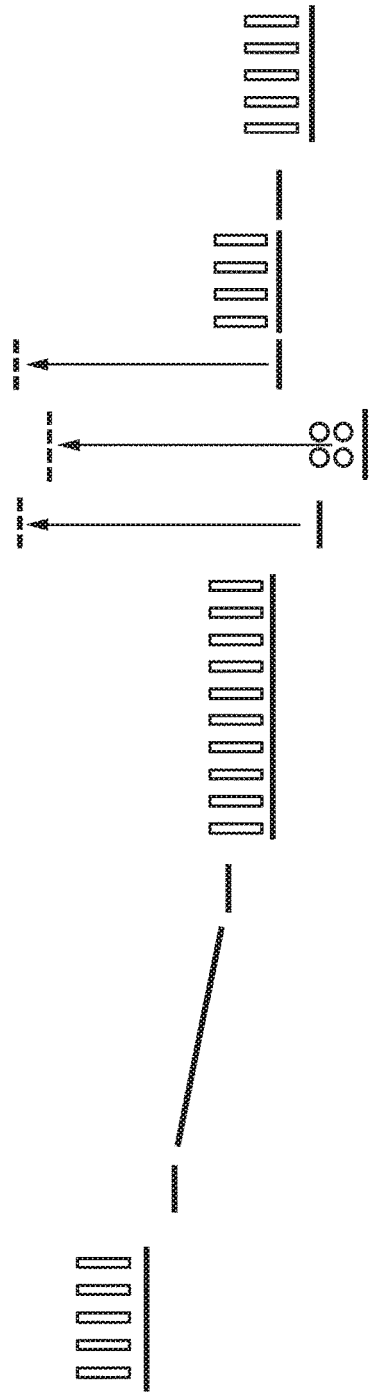

FIGS. 9A and 9B correspond to FIGS. 8A and 8B, except that they show how the potentials applied to the spectrometer are altered in preparation for moving ions from the ion entry/exit device 4 into the axially adjacent part of the IMS drift cell 2. As shown by the arrows in FIG. 9B, the DC potentials of the entrance gate 54, array electrodes 20, 22 and exit gate 56 are raised to the DC potentials illustrated by the horizontal dashed lines. The DC potentials applied to the arrays of electrodes 20, 22 are then equivalent to the DC potentials applied to the adjacent parts of the IMS drift cell 2, and hence there is no DC barrier preventing ions from passing from the ion entry/exit device 4 into the adjacent part of the IMS drift cell 2.

FIGS. 10A and 10B correspond to FIGS. 9A and 9B, except that they show the potentials at a stage when the ions are driven out of the ion entry/exit device 4 into the adjacent part of the IMS drift cell 2. As described above with reference to FIG. 7, the ions are driven out of the exit aperture 28 in the apertured exit plate 24 by applying DC travelling potentials to the columns of electrodes in the arrays of electrodes 20, 22. These travelling potentials are illustrated by the series of parallel horizontal lines 60 in FIG. 10B. The ions are then driven around the drift cell 2 by travelling DC potentials such that the ions separate according to their ion mobilities, as has been described above. When the ions have passed around the drift cell 2 the desired number of times, the ions may be ejected at the ion entry/exit device 4. The length of time the potentials of the electrode arrays 20, 22 are in the mode shown in FIG. 10B dictates how many passes the ions of given ion mobility make around drift cell 2. This timing may be based upon a desired path length, and hence resolution, for the ion separation mode of the IMS device.

FIGS. 11A and 11B correspond to FIGS. 10A and 10B, except that they show the DC potentials applied to the spectrometer at a stage when the ions are ejected from the drift cell 2 at the ion entry/exit device 4. As shown by the arrows in FIG. 11B, the DC potentials of the entrance gate 54, array electrodes 20, 22 and exit gate 56 are lowered to the DC potentials illustrated by the horizontal dashed lines. The DC potentials of the entrance gate 54, array electrodes 20, 22, exit gate 56, exit cell 45 and ion transfer cell 48 progressively decrease such that the ions are urged out of the ion entry/exit device 4 and along the spectrometer towards the ion transfer cell 48. The ions leave the ion entry/exit device 4 through the exit orifice 28 of the exit end plate 24 described above in relation to FIG. 5. A travelling DC wave is applied to the rows of electrodes in the electrode arrays 20, 22 in order to urge ions out of the exit orifice 28. This is represented by the series of vertical lines 62 in the electrode array region of FIG. 11B.

Varying the potentials applied to the ion entry/exit device 4 relative to the remainder of the drift cell 2 during loading or ejection of ions at the ion entry/exit device 4 facilitates ion entry and exit from the drift cell 2 without having to alter the potentials of the other components of the spectrometer that are upstream or downstream. This also enables a bypass mode in which ions are not separated in the drift cell 2. For example, the DC potentials of the entrance gate 54, electrode arrays 20, 22 and exit gate 56 may be made equivalent to the DC potentials of the accumulation cell 44 and exit cell 46 such that ions pass continuously from the accumulation cell 44, through the ion entry/exit device 4 and into the exit cell 46 without being separated in the drift cell 2.

The travelling DC waves applied to the drift cell 2 outside of the ion entry/exit device 4 may be operated continually during the above modes.

For example, although travelling DC potentials have been described as being used for driving ions around the region of the drift cell 2 outside of the ion entry/exit device 4, static DC gradients may be used instead for this purpose.

It will be appreciated that drift cells 2 having continuous ion guiding paths of shapes other than circular or oval paths are also contemplated as being within the scope of the present disclosure.

The drift cell 2 (or other type of device) need not be a closed-loop device around which ions are guided. For example, the ion entry/exit device 4 could be used in a linear device. The ions may pass along such a non-closed loop device once, or may be reflected along the device multiple times.

The geometry of the electrode arrays 20, 22 may be varied and need not be arrays having columns and rows of electrodes.

The direction of the travelling DC potentials in the electrode arrays may be changed or may provide multiple directional travel options.

It will be appreciated that, although not shown in FIGS. 8A to 11B, the IMS device may be coupled to a mass analyser for performing mass spectrometry on ions leaving the device. Such arrangements are shown, for example, in US 2017/0076926 (Micromass), the entire contents of which is incorporated herein by reference. For example, ions may be passed via the transfer cell 48 to a mass analyser of a mass spectrometer, such as a Time of Flight mass analyser.

Referring to FIG. 12, a detail of an IMS device in the region of the ion entry/exit device is shown. This is similar to the earlier embodiments described, but illustrates in more detail the possible location of ion stores associated with the separator. The IMS device includes an entrance 101 and an exit 102 to a cyclic drift cell 106, and one or more array of electrodes 104 for controlling the movement of ions in the region of the entrance and exit to provide an ion entry/exit device as in the earlier embodiments. In use, ions may travel around the cyclic drift cell in the direction of the arrows extending along the direction of the drift cell. A first ion store 110 is provided on one side of the drift cell 106, and extends in a direction orthogonal to the direction of movement of ions around the drift cell 106. A second ion store 108 is provided on an opposite side of the drift cell 106, again extending in a direction orthogonal to the direction of movement of ions around the drift cell 106. The first and second ion stores may be referred to as pre and post ion stores respectively, based on their position relative to the array 104. The ion entry/exit device may control the movement of ions to enter or leave either of the ion stores at desired times during operation of the IMS device as shown by the arrows superposed on the stores. For example, ions may be caused to enter a respective store when an instance of an "eject to prestore" or "eject to post store" mode is implemented.

Various particular embodiments directed to polymer sequence and/or connectivity determination, e.g. using the multi-stage ion mobility spectrometry techniques described above, will now be described.

According to various embodiments, the sequence and/or connectivity of polymeric molecules is determined using several stages of separation such as ion mobility separation and activation or fragmentation, e.g. as described above.

Various embodiments can be used to characterise linear and/or branched polymeric molecules consisting of the same subunits with different types of linkages between them, and/or to characterise linear and/or branched polymeric molecules consisting of different subunits and different types of linkage between them.

Embodiments may comprise determining sequence information based on the physicochemical properties of precursor ions and fragment ions, e.g. when these are known, and/or based on (ion mobility) spectral patterns, e.g. when physicochemical properties of precursor ions and fragment ions have not necessarily been (pre)determined. The physicochemical property or properties can be correlated with the shape, chemical structure, ion-neutral interaction potential, electronic structure and/or molecular weight of the ions. Various embodiments use multi-stage (ion mobility) separation and activation or fragmentation (e.g. as described above), optionally followed by mass to charge ratio (m/z) measurement. These techniques can provide an additional level of information and detail, e.g. in addition to a standard ion mobility-mass spectrometric (IM-MS) analysis.

Particular embodiments use a multi-pass ion mobility separator with variable resolution, which is capable of separation, selection, activation, and ion mobility separation of fragment ions (e.g. as described above). Various other embodiments utilise a device consisting of a series of ion mobility separators where fragmentation can be induced between separators (e.g. as described above in relation to FIG. 3).

In embodiments, the separation/fragmentation steps can be applied multiple times during a single experiment (i.e. using multiple fragmentation steps), thus allowing characterisation of the resulting generations of fragment ions.

According to various embodiments, and as described above, a pattern such as an ion mobility pattern of the first product ions is determined, and the first ions are identified and/or characterised using the (ion mobility) pattern of the first product ions.

In addition to this, in various embodiments, the method may comprise determining a pattern such as an ion mobility pattern of the second product ions, and identifying and/or characterising the second ions using the (ion mobility) pattern of the second product ions. The method may comprise determining a pattern such as an ion mobility pattern of the third and/or further product ions, and identifying and/or characterising the third and/or further ions using the (ion mobility) pattern of the third and/or further product ions.

As used herein, using the (ion mobility) pattern of the first (and/or second and/or third and/or further) product ions may comprise using the (ion mobility) pattern of the first product ions together with (where determined) the (ion mobility) pattern(s) of second generation product (granddaughter) ions derived from the first (and/or second and/or third and/or further) product ions. Equally, using the (ion mobility) pattern of the first (and/or second and/or third and/or further) product ions may comprise using the (ion mobility) pattern of the first product ions together with (where determined) the (ion mobility) pattern(s) of third and/or further generation product (great granddaughter) ions derived from the first (and/or second and/or third and/or further) product ions.

Various embodiments utilise the fact that, particularly for ions derived from polymeric molecules, the possible product ions (and second, third and/or further generation product ions) that can be derived from a particular analyte ion (by fragmenting the analyte ion (and optionally its product ions)) are limited.

In general, polymeric analyte ions may fragment (using one or more stages of fragmentation) to form at least one or more monomer ions, plus higher order polymeric ions (i.e. dimer product ions, trimer product ions, tetramer product ions, and so on) up to the order of polymeric ions that immediately precedes the order of the particular polymeric analyte ion that is being fragmented. Thus, for example, a pentamer polymeric analyte ion (i.e. an analyte ion formed from five monomers or molecular subunits) will typically give rise to monomer product ions, dimer product ions, trimer product ions and tetramer product ions, while a tetramer polymeric analyte ion (i.e. an analyte ion formed from four monomers or molecular subunits) will typically give rise to monomer product ions, dimer product ions, and trimer product ions, and so on.

Thus, according to various embodiments, the analyte ions (that are separated, etc., as described above) comprise (a mixture of) isomeric polymeric analyte ions of a particular order, and the first (second, third and/or further) product ions comprise polymeric product ions of a plurality of different orders, where each order of the plurality of different orders is less than the particular order of the isomeric polymeric analyte ions. In various embodiments, the first (second, third and/or further) product ions comprise polymeric product ions of each (and every) order that is less than the particular order of the isomeric polymeric analyte ions.

As used herein, the order of a polymeric analyte ion corresponds to the number of polymeric subunits that the polymeric analyte ion is formed from. Thus, for example, a monomer ion is a first order polymeric analyte ion, a dimer ion is a second order polymeric analyte ion, a trimer ion is a third order polymeric analyte ion, a tetramer ion is a fourth order polymeric analyte ion, a pentamer ion is a fifth order polymeric analyte ion, and so on.

Thus, according to various embodiments, the analyte ions (that are separated, etc., as described above) comprise (a mixture of) isomeric polymeric analyte ions, where each of the analyte ions is formed from a particular (the same) number of subunits. The first (second, third and/or further) product ions may comprise polymeric product ions formed from a plurality of different numbers of subunits, where each number of subunits of the plurality of different numbers of subunits is less than the particular number of subunits of the isomeric polymeric analyte ions. In various embodiments, the first (second, third and/or further) product ions comprise polymeric product ions of each (and every) number of subunits that is less than the particular number of subunits of the isomeric polymeric analyte ions.

Furthermore, for a mixture of isomeric polymeric analyte ions (i.e. for ions of polymeric molecules that are each formed of the same collection of monomers or molecular subunits, but that have different structures, e.g. different linkages between the monomers or molecular subunits), the difference in structure between the isomeric polymeric analyte ions will give rise to different product ions. That is, product ions derivable from one particular isomeric polymeric analyte ion will be different to the product ions derivable from another isomeric polymeric analyte ion.

In particular, the difference in structure between the isomeric polymeric analyte ions will give rise to isomeric product ions. That is, product ions derivable from one particular isomeric polymeric analyte ion will be isomeric with respect to product ions derivable from another isomeric polymeric analyte ion (e.g. where the isomerism arises due to the same structural difference being present in the product ions that was present in the parent analyte ions). Thus, in respect of one or more or each order of polymeric product ions (except at least monomer product ions) (e.g. for one or more or each of dimer product ions, trimer product ions, tetramer product ions, and so on) derivable from a mixture of isomeric polymeric analyte ions, there may be plural possible isomeric product ions of that order.

In various embodiments, the product ions of each order (being isomeric) will all have the same mass to charge ratio (m/z) (may be indistinguishable in mass to charge ratio), but will each have a different value of ion mobility.

Figure 13:
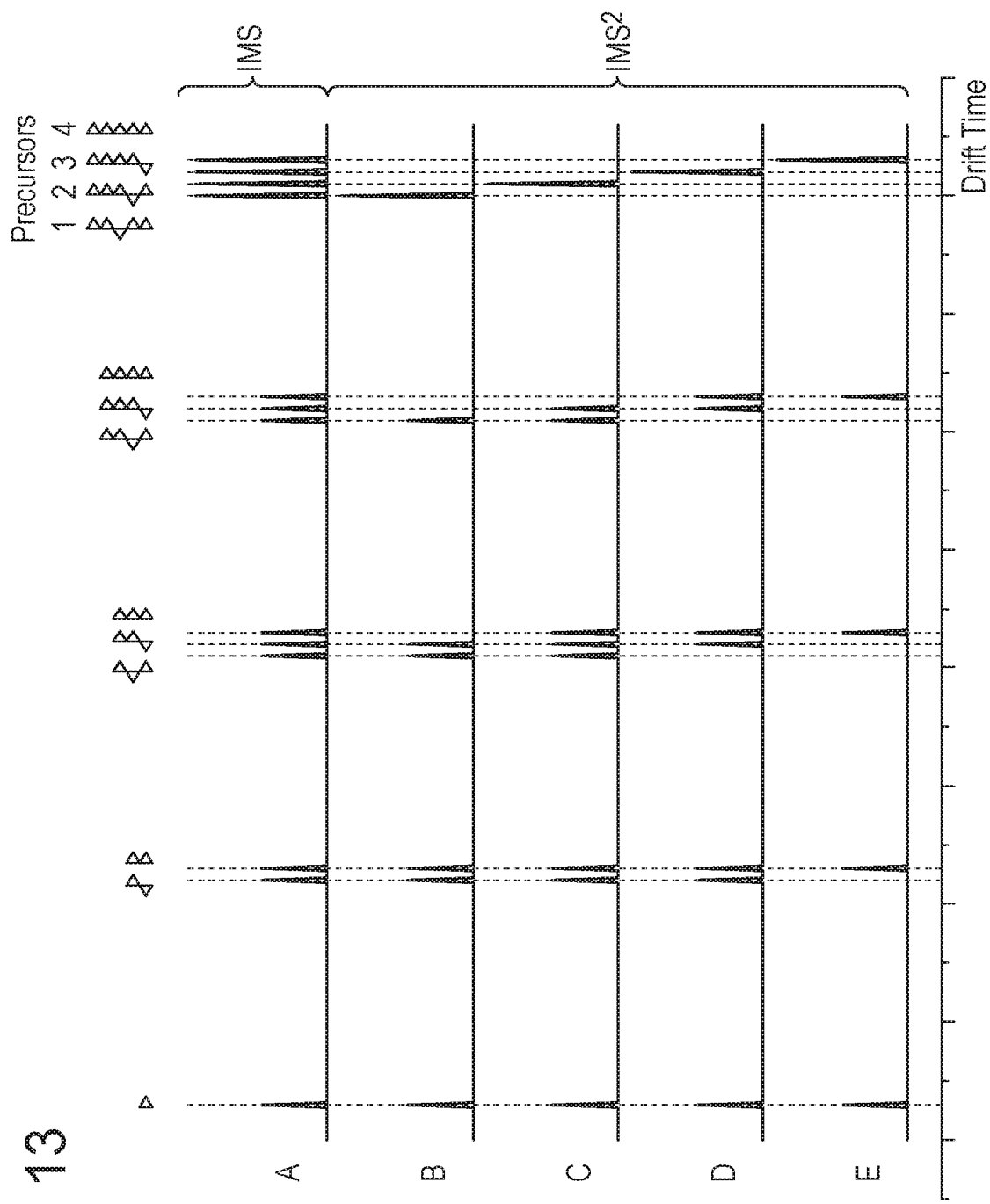
FIG. 13 shows schematically four pentamer precursor ions and their corresponding hypothetical ion mobility spectra, where

Thus, for example, as illustrated in FIG. 13, a linear pentamer may have four isomers which differ from one another with respect to the manner in which a single of the monomers or molecular subunits is linked to the other monomers or molecular subunits. In this example, although the monomer product ions derived from the four isomer analyte ions are all the same, there are two possible isomeric dimer product ions, three possible isomeric trimer product ions, and three possible isomeric tetramer product ions. As illustrated in FIG. 13, the isomerism in the dimer product ions, trimer product ions, and tetramer product ions arises due to the same or corresponding structural differences being present in the product ions to the structural differences that were present in the parent analyte ions.

Thus, according to various embodiments, the polymeric product ions of one or more or each order of the plurality of different orders comprise plural isomeric polymeric product ions. (Although the polymeric product ions of one or more or some (but not all) orders (such as the first order, i.e. monomers) of the plurality of different orders may comprise only one (non-isomeric) polymeric product ion.)

Moreover, the Applicants have recognised that each of the isomeric polymeric analyte ions is only capable of giving rise to (of being fragmented into) a sub-set (some but not all) of the possible isomeric product ions. What is more, it will often be the case that each of the isomeric polymeric analyte ions is only capable of giving rise to (of being fragmented into) a different sub-set of the possible isomeric product ions. This means that each of the isomeric polymeric analyte ions will give rise to (will be fragmented into) a (potentially unique) characteristic set of isomeric product ions.

Thus, for example, as illustrated in FIG. 13, the first isomeric polymeric analyte ion (labelled "1") can give rise to both of the possible isomeric dimer product ions, only two of the three possible isomeric trimer product ions, and only one of the three possible isomeric tetramer product ions. The second isomeric polymeric analyte ion (labelled "2") can give rise to both of the possible isomeric dimer product ions, all three of the three possible isomeric trimer product ions, and only two of the three possible isomeric tetramer product ions. The third isomeric polymeric analyte ion (labelled "3") can give rise to both of the possible isomeric dimer product ions, only two of the three possible isomeric trimer product ions, and only two of the three possible isomeric tetramer product ions. The fourth isomeric polymeric analyte ion (labelled "4") can give rise to only one of the two possible isomeric dimer product ions, only one of the three possible isomeric trimer product ions, and only one of the three possible isomeric tetramer product ions.

As such, in this example, the first isomeric polymeric analyte ion (labelled "1") has a characteristic ion mobility pattern of 1-2-2-1, the second isomeric polymeric analyte ion (labelled "2") has a characteristic ion mobility pattern of 1-2-3-2, the third isomeric polymeric analyte ion (labelled "3") has a characteristic ion mobility pattern of 1-2-2-2, and the fourth isomeric polymeric analyte ion (labelled "4") has a characteristic ion mobility pattern of 1-1-1-1.

Thus, according to various embodiments, the ion mobility pattern of the first product ions comprises, in respect of one or more or each order of the plurality of different orders, the number of isomeric polymeric product ions (the number of isomers) of that order that the first analyte ions give rise to (are fragmented into), i.e. that are present in the first product ions.

In other words, according to various embodiments, the ion mobility pattern of the first product ions comprises, in respect of one or more or each of the different numbers of subunits that the first product ions can be formed from, the number of different isomeric polymeric product ions (the number of isomers) having that number of subunits that the first analyte ions give rise to (are fragmented into), that is, that are present in the first product ions.

Thus, for example, the ion mobility pattern of the first product ions may comprise the number of different isomeric polymeric product ions of the first order (the number of different isomeric monomers) that are present in the first product ions, and/or the number of different isomeric polymeric product ions of the second order (the number of different isomeric dimers) that are present in the first product ions, and/or the number of different isomeric polymeric product ions of the third order (the number of different isomeric trimers) that are present in the first product ions, and/or the number of different isomeric polymeric product ions of the fourth order (the number of different isomeric tetramers) that are present in the first product ions, and/or the number of different isomeric polymeric product ions of the fifth order (the number of different isomeric pentamers) that are present in the first product ions, and so on.

(Similarly, according to various embodiments, the ion mobility pattern of the second and/or third and/or further product ions comprises, in respect of one or more or each order of the plurality of different orders, the number of isomeric polymeric product ions (the number of isomers) of that order that the second and/or third and/or further analyte ions give rise to (are fragmented into), i.e. that are present in the second and/or third and/or further product ions. The ion mobility pattern of the second and/or third and/or further product ions may comprise, in respect of one or more or each of the different numbers of subunits that the second and/or third and/or further product ions can be formed from, the number of different isomeric polymeric product ions (the number of isomers) having that number of subunits that the second and/or third and/or further analyte ions give rise to (are fragmented into), that is, that are present in the second and/or third and/or further product ions.)

Thus, in various embodiments, the method comprises determining the ion mobility pattern of the first product ions by determining, in respect of one or more or each order of the plurality of different orders, the number of isomeric polymeric product ions (the number of isomers) of that order that are present in the first product ions, and identifying and/or characterising the first ions using the ion mobility pattern of the first product ions. That is, determining the ion mobility pattern of the first product ions by determining, in respect of one or more or each of the different number of subunits that the first product ions can be formed from, the number of different isomeric polymeric product ions (the number of isomers) having that number of subunits that are present in the first product ions, and identifying and/or characterising the first ions using the ion mobility pattern of the first product ions.

(Similarly, in various embodiments, the method comprises determining the ion mobility pattern of the second and/or third and/or further product ions by determining, in respect of one or more or each order of the plurality of different orders, the number of isomeric polymeric product ions (the number of isomers) of that order that are present in the second and/or third and/or further product ions, and identifying and/or characterising the second and/or third and/or further ions using the ion mobility pattern of the second and/or third and/or further product ions. Determining the ion mobility pattern of the second and/or third and/or further product ions may comprise determining, in respect of one or more or each of the different number of subunits that the second and/or third and/or further product ions can be formed from, the number of different isomeric polymeric product ions (the number of isomers) having that number of subunits that are present in the second and/or third and/or further product ions, and identifying and/or characterising the second and/or third and/or further ions using the ion mobility pattern of the first product ions.)

These characteristic ion mobility patterns allow the isomeric polymeric analyte ions to be distinguished (identified), but also allow structural information of each isomeric polymeric analyte ion to be derived (i.e. allow each analyte ion to be characterised).

In this regard, since as described above, each ion mobility pattern can be unique, the first analyte ions may be identified and/or characterised solely on the basis of the ion mobility pattern of the first product ions (and correspondingly each of the second and/or third and/or further analyte ions may be identified and/or characterised solely on the basis of the ion mobility pattern of the second and/or third and/or further product ions, respectively).

Additionally or alternatively, the first analyte ions may be identified and/or characterised using the ion mobility pattern of the first product ions and the ion mobility pattern of one or more or each of the second and/or third and/or further product ions, e.g. by comparing respective ion mobility patterns (and correspondingly each of the second and/or third and/or further analyte ions may be identified and/or characterised using plural ion mobility patterns, e.g. by comparing respective ion mobility patterns).

Thus, the method may comprise comparing the first and/or second and/or third and/or further ion mobility patterns, and identifying and/or characterising the first and/or second and/or third and/or further ions based on the comparison.

An example will now be described in more detail in terms of the hypothetical mixture of four linear pentamers with differing tacticity illustrated in FIG. 13.

FIG. 13 shows schematically ion mobility spectra of the mixture of four linear pentamers and their fragment ions (i.e. pentamer precursor ions and their corresponding hypothetical ion mobility spectra). FIG. 13A shows the hypothetical results of a collision induced dissociation-ion mobility separation (CID-IMS) experiment. FIGS. 13B-E show the hypothetical results of ion mobility separation-collision induced dissociation-ion mobility separation (IMS-CID-IMS, or IMS$^2$) experiments on each of the precursor ions.

The four precursor ions (illustrated in the top right-hand corner of FIG. 13) are isomers formed of the same number (five) of "triangle" sub-units, and therefore have the same mass to charge ratio (m/z) but different ion mobility separation (IMS) drift times because of their different structures. As shown in FIG. 13, the different structure is due to one of the sub-units (its connectivity) being modified with respect to the other sub-units.

Fragmenting these precursor ions (using one or more stages of fragmentation) produces fragment ions comprising either one, two, three or four "triangle" sub-units, i.e. monomers, dimers, trimers and tetramers. Thus, in FIG. 13, pentamer precursor ions are represented by four shapes (top right) (each made of up five triangles), whereby first and second generation fragment ions are each represented by 3 shapes (top), (each made up of either four or three triangles), and third and fourth generation fragment ions are represented by two and one shapes, respectively (each made up of two or one triangles, respectively).

Thus, as shown in FIG. 13, there is one possible monomer fragment ion, two possible dimer fragment ions, three possible trimer fragment ions, and three possible tetramer fragment ions. The two possible dimer fragment ions are isomers formed of the same number (two) of "triangle" sub-units (and therefore have the same mass to charge ratio (m/z) but different IMS drift times), the three possible trimer fragment ions are isomers formed of the same number (three) of "triangle" sub-units (and therefore have the same mass to charge ratio (m/z) but different IMS drift times), and the three possible tetramer fragment ions are isomers formed of the same number (four) of "triangle" sub-units (and therefore have the same mass to charge ratio (m/z) but different IMS drift times).

The mobility spectrum in FIG. 13A corresponds to the spectrum of the mixture, and is produced by fragmentation followed by ion mobility separation. From the spectrum in FIG. 13A, one can learn that there are four isomeric components in the mixture, however tacticity assignment is ambiguous.

As described above, in various embodiments, each of the four IMS separated precursor ions are selected (isolated) in turn and fragmented. Then, by looking at the resulting ion mobility separated fragmentation pattern, the structure of the corresponding precursor ion can be determined, i.e. the location of the modification in the molecule can be determined. Thus, by employing the method of various embodiments to this example, each of the four separated precursor ions is selected and selectively dissociated, i.e. so as to obtain ion mobility spectra of fragments ("IMS$^2$"), as shown in FIGS. 13B-E.

It is apparent from FIGS. 13B-E that each of the precursor ions produces a unique fragmentation pattern, with the number of peaks relating to monomer-dimer-trimer—tetramer species being:

B: 1-2-2-1
C: 1-2-3-2
D: 1-2-2-2
E: 1-1-1-1

It will accordingly be appreciated that, according to various embodiments, one can not only separate (identify) the precursor ions, but also assign (characterise) the location of the structural modification based on the fragmentation pattern.

This method can be further applied to fragment ions in order to elucidate their structure and dissociation mechanism.

Figure 14:
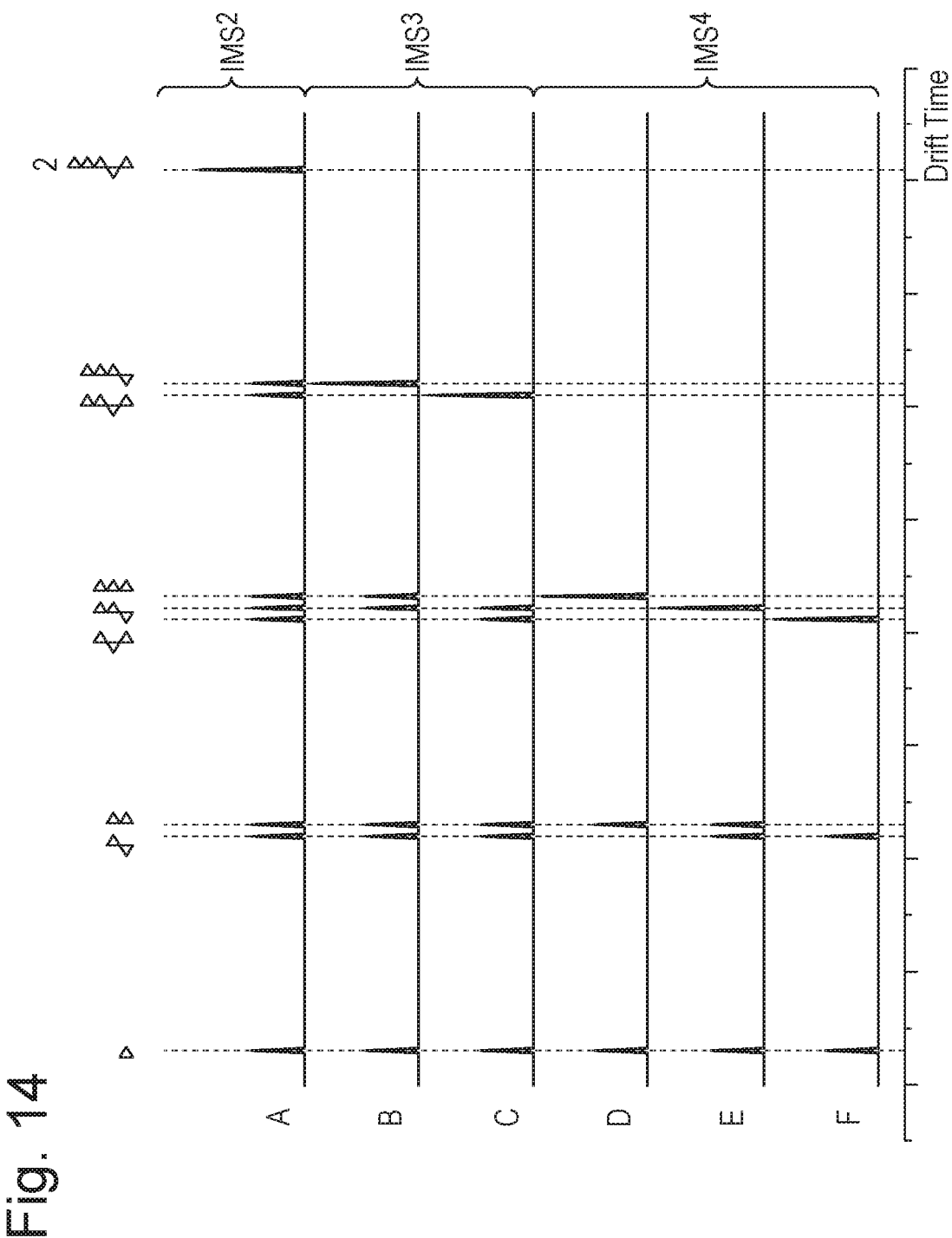
FIG. 14 shows hypothetical ion mobility spectra for IMS$^n$ experiments on the second pentamer precursor ion of FIG. 13, where

FIG. 14 shows the results of hypothetical IMS$^n$ experiments on the second pentamer precursor ion ("pentamer precursor ion no. 2") of FIG. 13.

FIG. 14A shows the results of an IMS$^2$ experiment (as per FIG. 13C). The first generation fragment ions from the second precursor ion (no. 2) (as shown in FIG. 14A) can be mobility selected, dissociated and mobility separated ("IMS$^3$"). Then, second generation fragment ions can be mobility selected, dissociated and mobility separated ("IMS$^4$"). FIGS. 14B-C show hypothetical ion mobility spectra for first generation fragment ions that are selectively dissociated followed by mobility separation of their products (IMS$^3$). FIGS. 14D-F show hypothetical ion mobility spectra for second generation fragment ions that are selectively dissociated, followed by mobility separation of their products (IMS$^4$).

By assessment of the dissociation patterns of the second and third generation fragment ions (i.e. as shown in FIGS. 14D-F), one can learn, for example, that the fastest and the slowest of second generation fragment ions have a structurally symmetric sequence, while the middle one has an asymmetric sequence, that is, it can produce two distinct product ions.

The techniques of various embodiments can be applied, in particular, to polymers where structural differences arise from the stereochemistry of the linkage between the sub-units, for example α and β-anomeric forms of glycosidic bonds.

Figure 15:
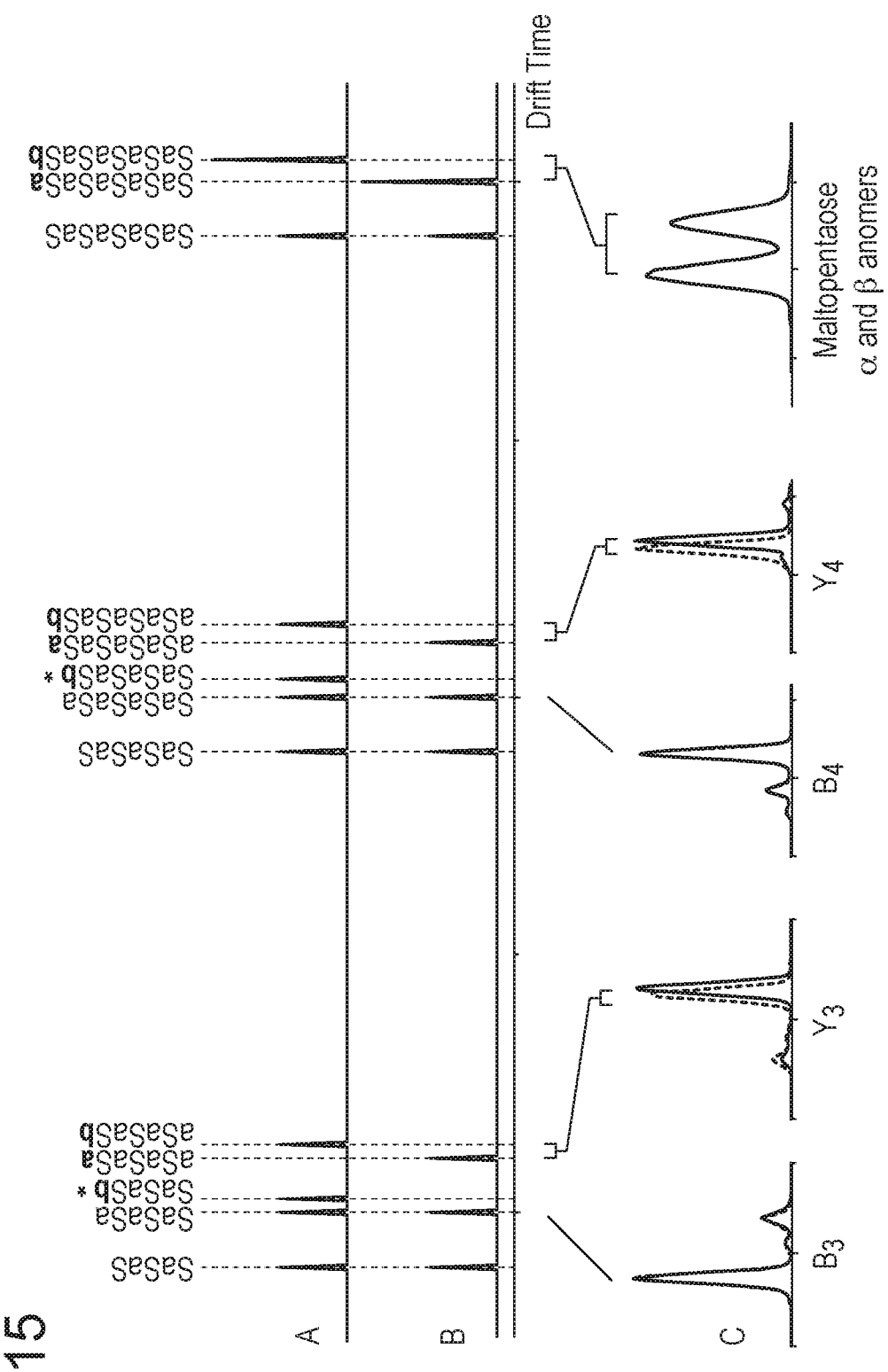
FIG. 15A shows a hypothetical ion mobility spectrum for an IMS$^2$ experiment of the hypothetical pentamer SaSaSaSaSb.
FIG. 15B shows a hypothetical ion mobility spectrum for an IMS$^2$ experiment of the hypothetical pentamer SaSaSaSaSa.
FIG. 15C shows experimental data obtained by analysing an analogous sample Maltopentaose anomers using a multi-stage ion mobility experiment.

FIGS. 15A and 15B show hypothetical ion mobility spectra of hypothetical pentamers, consisting of identical subunits (S), linked by α and β glycosidic bonds (denoted by a and b). Two forms are shown: SaSaSaSaSb (FIG. 15A) and SaSaSaSaSa (FIG. 15B).

FIG. 15C shows experimental IMS$^2$ data obtained by analysing an analogous experimental sample, namely α and β anomers of Maltopentaose, using a multi-stage ion mobility experiment (as described above).

Figure 16:
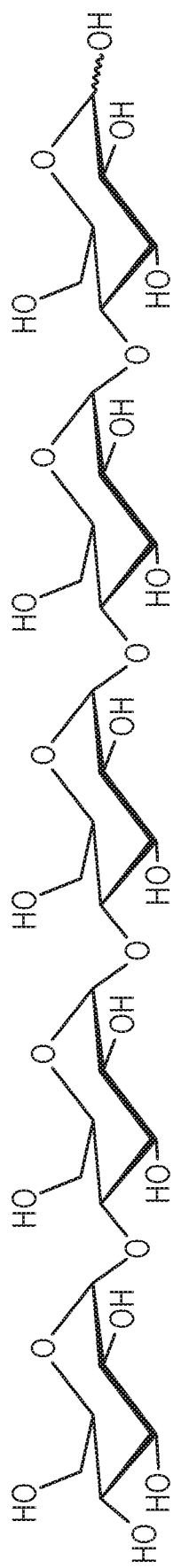
FIG. 16 shows schematically the structure of Maltopentaose.

FIG. 16 shows the structure of Maltopentaose. Maltopentaose contains 5 glucose units linked by α-1,4 glycosidic bonds. In solution, the reducing end (right) undergoes a reversible ring opening reaction, therefore α and β anomeric forms exist in equilibrium. This reaction does not occur under typical ion mobility-mass spectrometry conditions. Therefore, the two forms can be observed and separated.

In the experimental data shown in FIG. 15C, Collision Induced Dissociation (CID) was used to produce the fragment ions. Diagnostic Y-type fragments (aSaSaSaSa and aSaSaSaSb) contain the reducing end of the saccharide and thus have different ion mobilities, while non-diagnostic B-type fragments (shown in lighter grey) are the same. The presence of the diagnostic Z-type fragments (marked by asterisks) would allow the complete assignment but were not experimentally detected.

It should be noted that, especially in the case of oligosaccharides, reference compounds with a single type of linkage throughout are readily available, while reference compounds with mixed linkages are difficult to obtain. This is an impediment in development of sequence assignment methods relying only on the reference compound measurements.

An example will now be described wherein a pattern matching approach is used for structural assignment of a mixed linkage homomonomeric oligosaccharides.

Table 1 shows the IMS-MS fragmentation patterns predicted for all possible variations (64) of an oligosaccharide consisting of 5 identical subunits (denoted by S) connected with a and β-types of 1,4 glycosidic bond (denoted by a and b) (i.e. connected with all possible sequences of 2 glycosidic bond). Table 1 shows the theoretical number of ion mobility spectral features per mass to charge ratio (m/z) calculated for the oligosaccharide consisting of 5 identical subunits S. The mass to charge ratio (m/z) values are based on fragmentation of sodiated species (M+Na)$^+$, where the mass of subunit S=145 Da, linkers a,b=17 Da, and sodium Na=23 Da.

TABLE 1

| Sequence | 850 | 833 | 816 | 688 | 671 | 654 | 526 | 509 | 492 | 364 | 347 | 330 | 202 | 185 | 168 | Pattern occurences | |
|---|---|---|---|---|---|---|---|---|---|---|---|---|---|---|---|---|---|
| aSaSaSaSaSa | 1 | 1 | 1 | 1 | 1 | 1 | 1 | 1 | 1 | 1 | 1 | 1 | 1 | 1 | 1 | 2 | |
| bSbSbSbSbSb | 1 | 1 | 1 | 1 | 1 | 1 | 1 | 1 | 1 | 1 | 1 | 1 | 1 | 1 | 1 | | |
| aSbSbSbSbSa | 1 | 1 | 1 | 1 | 2 | 1 | 2 | 2 | 1 | 2 | 2 | 1 | 2 | 2 | 1 | 2 | |
| bSaSaSaSaSb | 1 | 1 | 1 | 1 | 2 | 1 | 2 | 2 | 1 | 2 | 2 | 1 | 2 | 2 | 1 | | |
| aSbSaSaSbSa | 1 | 1 | 1 | 1 | 2 | 1 | 2 | 3 | 2 | 2 | 3 | 2 | 2 | 2 | 1 | 2 | |
| bSaSbSbSaSb | 1 | 1 | 1 | 1 | 2 | 1 | 2 | 3 | 2 | 2 | 3 | 2 | 2 | 2 | 1 | | |
| aSaSbSbSaSa | 1 | 1 | 1 | 1 | 2 | 1 | 2 | 3 | 2 | 2 | 4 | 2 | 3 | 2 | 1 | 2 | |
| bSbSaSaSbSb | 1 | 1 | 1 | 1 | 2 | 1 | 2 | 3 | 2 | 2 | 4 | 2 | 3 | 2 | 1 | | |
| aSbSaSbSaSb | 1 | 2 | 1 | 2 | 2 | 2 | 1 | 2 | 1 | 2 | 2 | 2 | 1 | 2 | 1 | 2 | |
| bSaSbSaSbSa | 1 | 2 | 1 | 2 | 2 | 2 | 1 | 2 | 1 | 2 | 2 | 2 | 1 | 2 | 1 | | |
| aSaSbSaSaSb | 1 | 2 | 1 | 2 | 4 | 2 | 3 | 4 | 1 | 4 | 4 | 2 | 3 | 2 | 1 | 2 | |
| bSbSaSbSbSa | 1 | 2 | 1 | 2 | 4 | 2 | 3 | 4 | 1 | 4 | 4 | 2 | 3 | 2 | 1 | | |
| aSbSbSaSaSb | 1 | 2 | 1 | 2 | 4 | 2 | 3 | 4 | 3 | 2 | 4 | 2 | 3 | 2 | 1 | 2 | |
| bSaSaSbSbSa | 1 | 2 | 1 | 2 | 4 | 2 | 3 | 4 | 3 | 2 | 4 | 2 | 3 | 2 | 1 | | |
| aSaSaSbSbSb | 1 | 2 | 1 | 2 | 4 | 2 | 3 | 6 | 3 | 4 | 4 | 2 | 3 | 2 | 1 | 2 | |
| bSbSaSaSaSa | 1 | 2 | 1 | 2 | 4 | 2 | 3 | 6 | 3 | 4 | 4 | 2 | 3 | 2 | 1 | | 16/64 |
| aSaSaSaSbSb | 1 | 2 | 1 | 2 | 2 | 1 | 2 | 2 | 1 | 2 | 2 | 1 | 2 | 2 | 1 | 4 | |
| aSbSbSbSbSb | 1 | 2 | 1 | 2 | 2 | 1 | 2 | 2 | 1 | 2 | 2 | 1 | 2 | 2 | 1 | | |
| bSaSaSaSaSa | 1 | 2 | 1 | 2 | 2 | 1 | 2 | 2 | 1 | 2 | 2 | 1 | 2 | 2 | 1 | | |
| bSbSbSbSbSa | 1 | 2 | 1 | 2 | 2 | 1 | 2 | 2 | 1 | 2 | 2 | 1 | 2 | 2 | 1 | | |
| aSaSaSbSaSb | 1 | 2 | 1 | 2 | 3 | 1 | 3 | 4 | 2 | 3 | 4 | 2 | 3 | 2 | 1 | 4 | |
| aSbSaSbSbSb | 1 | 2 | 1 | 2 | 3 | 1 | 3 | 4 | 2 | 3 | 4 | 2 | 3 | 2 | 1 | | |
| bSaSbSaSaSa | 1 | 2 | 1 | 2 | 3 | 1 | 3 | 4 | 2 | 3 | 4 | 2 | 3 | 2 | 1 | | |
| bSbSbSaSbSa | 1 | 2 | 1 | 2 | 3 | 1 | 3 | 4 | 2 | 3 | 4 | 2 | 3 | 2 | 1 | | |
| aSaSbSaSbSa | 1 | 2 | 1 | 2 | 3 | 2 | 2 | 3 | 1 | 3 | 3 | 2 | 2 | 2 | 1 | 4 | |
| aSbSaSbSaSa | 1 | 2 | 1 | 2 | 3 | 2 | 2 | 3 | 1 | 3 | 3 | 2 | 2 | 2 | 1 | | |
| bSaSbSaSbSb | 1 | 2 | 1 | 2 | 3 | 2 | 2 | 3 | 1 | 3 | 3 | 2 | 2 | 2 | 1 | | |
| bSbSaSbSaSb | 1 | 2 | 1 | 2 | 3 | 2 | 2 | 3 | 1 | 3 | 3 | 2 | 2 | 2 | 1 | | |
| aSaSaSbSaSa | 1 | 2 | 1 | 2 | 3 | 2 | 2 | 3 | 2 | 2 | 3 | 2 | 2 | 2 | 1 | 4 | |
| aSbSbSaSbSb | 1 | 2 | 1 | 2 | 3 | 2 | 2 | 3 | 2 | 2 | 3 | 2 | 2 | 2 | 1 | | |
| bSaSaSbSaSa | 1 | 2 | 1 | 2 | 3 | 2 | 2 | 3 | 2 | 2 | 3 | 2 | 2 | 2 | 1 | | |
| bSbSbSaSbSa | 1 | 2 | 1 | 2 | 3 | 2 | 2 | 3 | 2 | 2 | 3 | 2 | 2 | 2 | 1 | | |
| aSaSbSbSbSa | 1 | 2 | 1 | 2 | 3 | 2 | 2 | 4 | 2 | 3 | 4 | 2 | 3 | 2 | 1 | 4 | |
| aSbSaSaSaSa | 1 | 2 | 1 | 2 | 3 | 2 | 2 | 4 | 2 | 3 | 4 | 2 | 3 | 2 | 1 | | |
| bSaSbSbSbSb | 1 | 2 | 1 | 2 | 3 | 2 | 2 | 4 | 2 | 3 | 4 | 2 | 3 | 2 | 1 | | |
| bSbSaSaSaSa | 1 | 2 | 1 | 2 | 3 | 2 | 2 | 4 | 2 | 3 | 4 | 2 | 3 | 2 | 1 | | |
| aSaSbSbSaSb | 1 | 2 | 1 | 2 | 4 | 2 | 3 | 4 | 2 | 3 | 4 | 2 | 3 | 2 | 1 | 4 | |
| aSbSbSbSaSb | 1 | 2 | 1 | 2 | 4 | 2 | 3 | 4 | 2 | 3 | 4 | 2 | 3 | 2 | 1 | | |
| bSbSaSaSaSa | 1 | 2 | 1 | 2 | 4 | 2 | 3 | 4 | 2 | 3 | 4 | 2 | 3 | 2 | 1 | | |
| bSbSaSaSaSa | 1 | 2 | 1 | 2 | 4 | 2 | 3 | 4 | 2 | 3 | 4 | 2 | 3 | 2 | 1 | | |
| aSaSbSaSbSb | 1 | 2 | 1 | 2 | 4 | 2 | 3 | 5 | 2 | 4 | 3 | 2 | 2 | 2 | 1 | 4 | |
| aSbSbSbSaSa | 1 | 2 | 1 | 2 | 4 | 2 | 3 | 5 | 2 | 4 | 3 | 2 | 2 | 2 | 1 | | |
| bSaSbSaSaSa | 1 | 2 | 1 | 2 | 4 | 2 | 3 | 5 | 2 | 4 | 3 | 2 | 2 | 2 | 1 | | |
| bSbSaSbSbSa | 1 | 2 | 1 | 2 | 4 | 2 | 3 | 5 | 2 | 4 | 3 | 2 | 2 | 2 | 1 | | |
| aSaSbSaSaSa | 1 | 2 | 1 | 2 | 4 | 2 | 3 | 5 | 3 | 3 | 4 | 2 | 3 | 2 | 1 | 4 | |
| aSbSaSaSaSa | 1 | 2 | 1 | 2 | 4 | 2 | 3 | 5 | 3 | 3 | 4 | 2 | 3 | 2 | 1 | | |
| bSaSaSbSbSb | 1 | 2 | 1 | 2 | 4 | 2 | 3 | 5 | 3 | 3 | 4 | 2 | 3 | 2 | 1 | | |
| bSbSbSaSaSb | 1 | 2 | 1 | 2 | 4 | 2 | 3 | 5 | 3 | 3 | 4 | 2 | 3 | 2 | 1 | | 32/64 |
| aSaSbSbSaSa | 1 | 2 | 1 | 2 | 3 | 2 | 2 | 4 | 2 | 3 | 3 | 2 | 2 | 2 | 1 | 8 | |
| aSaSbSbSaSa | 1 | 2 | 1 | 2 | 3 | 2 | 2 | 4 | 2 | 3 | 3 | 2 | 2 | 2 | 1 | | |
| aSbSaSaSaSb | 1 | 2 | 1 | 2 | 3 | 2 | 2 | 4 | 2 | 3 | 3 | 2 | 2 | 2 | 1 | | |
| aSbSbSbSbSb | 1 | 2 | 1 | 2 | 3 | 2 | 2 | 4 | 2 | 3 | 3 | 2 | 2 | 2 | 1 | | |
| bSaSaSaSbSa | 1 | 2 | 1 | 2 | 3 | 2 | 2 | 4 | 2 | 3 | 3 | 2 | 2 | 2 | 1 | | |
| bSaSbSbSbSa | 1 | 2 | 1 | 2 | 3 | 2 | 2 | 4 | 2 | 3 | 3 | 2 | 2 | 2 | 1 | | |
| bSbSaSbSbSb | 1 | 2 | 1 | 2 | 3 | 2 | 2 | 4 | 2 | 3 | 3 | 2 | 2 | 2 | 1 | | |
| bSbSbSbSaSb | 1 | 2 | 1 | 2 | 3 | 2 | 2 | 4 | 2 | 3 | 3 | 2 | 2 | 2 | 1 | | |
| aSaSaSbSbSa | 1 | 2 | 1 | 2 | 4 | 2 | 3 | 4 | 2 | 3 | 3 | 2 | 2 | 2 | 1 | 8 | |
| aSbSaSaSbSa | 1 | 2 | 1 | 2 | 4 | 2 | 3 | 4 | 2 | 3 | 3 | 2 | 2 | 2 | 1 | | |
| aSbSaSbSbSa | 1 | 2 | 1 | 2 | 4 | 2 | 3 | 4 | 2 | 3 | 3 | 2 | 2 | 2 | 1 | | |
| aSbSbSaSbSa | 1 | 2 | 1 | 2 | 4 | 2 | 3 | 4 | 2 | 3 | 3 | 2 | 2 | 2 | 1 | | |
| bSaSaSbSaSb | 1 | 2 | 1 | 2 | 4 | 2 | 3 | 4 | 2 | 3 | 3 | 2 | 2 | 2 | 1 | | |
| bSaSbSaSaSb | 1 | 2 | 1 | 2 | 4 | 2 | 3 | 4 | 2 | 3 | 3 | 2 | 2 | 2 | 1 | | |
| bSaSbSbSaSb | 1 | 2 | 1 | 2 | 4 | 2 | 3 | 4 | 2 | 3 | 3 | 2 | 2 | 2 | 1 | | |
| bSbSbSaSaSb | 1 | 2 | 1 | 2 | 4 | 2 | 3 | 4 | 2 | 3 | 3 | 2 | 2 | 2 | 1 | | 16/64 |

From Table 1, it is apparent that in 25% of cases (16 out of 64), the saccharide sequence can be assigned with a probability of 0.5. The assignment probability is limited by a sequence symmetry. For example, the sequences bSaSaSaSaSb and aSbSbSbSbSa will produce an identical fragmentation pattern.

In 50% of cases (32 out of 64), the sequence can be assigned with a probability of 0.25. The remaining 25% of cases can be assigned with a probability of 0.125.

In order to distinguish symmetrical doublets such as bSaSaSaSaSb and aSbSbSbSbSa, the drift time of a diagnostic fragment (for example SaSaSa) can be compared with that of the reference standard. Using the principal compounds aSaSaSaSaSa/b and bSbSbSbSbSa/b and their fragments as references, all the symmetrical doublets can be distinguished.

The same strategy (and reference compounds) can be used to reduce "pattern indistinguishable" quadruplets (such as:

aSaSaSaSaSb, aSbSbSbSbSb, bSaSaSaSaSa, bSbSbSbSbSa) into two sets of inverse doublets:
aSaSaSaSaSb and aSbSbSbSbSb
aSbSbSbSbSb and bSbSbSbSbSa The same strategy (and reference compounds) can be used to reduce "pattern indistinguishable" octuplets (such as: aSaSaSbSaSa, aSaSbSaSaSa, aSbSaSaSaSb, bSaSaSbSaSa, aSbSbSbSaSb, bSaSbSbSbSa, bSbSaSbSbSb, bSbSbSaSbSb) into four sets of inverse doublets:
aSaSaSbSaSa and aSaSbSaSaSa
aSbSaSaSaSb and bSaSaSaSbSa
aSbSbSbSaSb and bSaSbSbSbSa
bSbSaSbSbSb and bSbSbSaSbSb Therefore, using pattern matching assisted by reference comparison, 25% of cases can be assigned with a probability of 1, and the remaining 75% with a probability of 0.5.

It should also be noted that in the 0.5 probability cases, only the sequence start/end is unknown.

Although the above examples have described in terms of linear polymeric molecules, a similar experimental strategy can be used for analysis of branching in polymeric molecules.

The method according to various embodiments can be applied with or without mass selection of the precursor ions.

Multi-stage ion mobility separation can work in conjunction with a range of ion fragmentation methods, such as any one of the fragmentation methods described above, and one or more different of these methods can be applied between different stages.

Various embodiments are suited for analysis by comparative pattern matching, which make them attractive for non-linear ion mobility separation methods such as travelling wave ion mobility separation (TWIMS), Field Asymmetric Ion Mobility Spectrometry (FAIMS), or combination of thereof. Thus, although the above embodiments have been primarily described in terms of separating ions according to their ion mobility using an ion mobility separator such as a closed-loop TWIMS device, it would also be possible to separate ions according to their rate of change of ion mobility with electric field strength, i.e. using a FAIMS device.

In various embodiments, a database of known patterns may be provided. The pattern(s) determined in the manner described above may then be compared with entries in the database of patterns, so as to identify the determined pattern(s). These database searching approaches may be used to improve confidence in the identification of the analyte(s).

Thus, various embodiments comprise comparing the pattern of the first (and/or second and/or third and/or further) product ions with one or more patterns of a database of known patterns, and identifying and/or characterising the first (and/or second and/or third and/or further) ions on the basis of the comparison.

It should be noted that it is not necessary in the above-described pattern matching approaches to measure the collision cross section (CCS) values of ions. However, the pattern matching approaches can be enhanced if CCS values are measured, and for example used in database searching techniques.

Thus, in various embodiments, a database of known collision cross section (CCS) values is provided. Measured CCS values may then be compared with entries in the database of CCS values, so as to identify the ions. These database searching approaches may be used to improve confidence in the identification of the analyte(s). Thus, various embodiments are suited for analysis utilising database searching, which makes them attractive for ion mobility separation methods which yield collision cross sections (CCS) results.

Thus, various embodiments comprise measuring the collision cross section(s) (CCS) of the first ions and/or the first product ions and/or the second generation product ions (and/or the second and/or the third and/or the further ions and/or product ions), and identifying and/or characterising the first (and/or second and/or third and/or further) ions on the basis of the measurement.

It will be appreciated that various embodiments provide a means of structural analysis of isomeric molecules which produce isomeric fragment ions. Various embodiments provide a means of sequence, connectivity and/or tacticity assignment by fragmentation pattern matching.

It will be appreciated from the above that various embodiments provide an improved method of mass and/or ion mobility spectrometry.

Although the present invention has been described with reference to preferred embodiments, it will be understood by those skilled in the art that various changes in form and detail may be made without departing from the scope of the invention as set forth in the accompanying claims.

The invention claimed is:

1. A method of identifying and/or characterising ions, the method comprising:
separating analyte ions according to a first physico-chemical property;
selecting first ions of the analyte ions, and activating, fragmenting or reacting the first ions to produce first product ions;
separating the first product ions according to the first physico-chemical property, and determining a pattern of the first product ions; and
identifying and/or characterising the first ions using the pattern of the first product ions.

2. The method of claim 1, wherein the first physico-chemical property comprises ion mobility or rate of change of ion mobility with electric field strength.

3. The method of claim 1, wherein:
the analyte ions, the first ions and/or the first product ions are polymeric; and/or
the analyte ions, the first ions and/or the first product ions are isomeric.

4. The method of claim 1, wherein the analyte ions comprise isomeric polymeric analyte ions of a particular order, and the first product ions comprise polymeric product ions of a plurality of different orders, each order of the plurality of different orders being less than the particular order of the isomeric polymeric analyte ions.

5. The method of claim 4, wherein the pattern of the first product ions comprises, in respect of one or more or each order of the plurality of different orders, the number of isomers of that order that are present in the first product ions.

6. The method of claim 1, wherein characterising the first ions using the pattern of the first product ions comprises determining structural information of the first ions from the pattern of the first product ions.

7. The method of claim 1, further comprising:
selecting second ions of the analyte ions, and activating, fragmenting or reacting the second ions to produce second product ions;
separating the second product ions according to the first physico-chemical property, and determining a pattern of the second product ions; and
identifying and/or characterising the first and/or second ions using the pattern of the second product ions.

8. The method of claim 7, further comprising comparing the pattern of the first product ions with the pattern of the second product ions, and identifying and/or characterising the first and/or second ions on the basis of the comparison.

9. The method of claim 1, further comprising:
  selecting particular ions of the first product ions, and activating, fragmenting or reacting the particular ions to produce second generation product ions; and
  separating the second generation product ions according to the first physico-chemical property, and determining a pattern of the second generation product ions;
  wherein the pattern of the first product ions includes the pattern of the second generation product ions.

10. The method of claim 1, comprising separating the analyte ions according to the first physico-chemical property using a cyclic or closed-loop separator and separating the first product ions according to the first physico-chemical property using the cyclic or closed-loop separator.

11. A mass and/or ion mobility spectrometer, comprising:
  one or more activation, collision, fragmentation or reaction devices;
  one or more separators; and
  a control system, wherein the control system is configured:
  to cause the one or more separators to separate analyte ions according to a first physico-chemical property;
  to cause first ions of the analyte ions to be selected, and to cause the one or more activation, collision, fragmentation or reaction devices to activate, fragment or react the first ions to produce first product ions;
  to cause the one or more separators to separate the first product ions according to the first physico-chemical property;
  to determine a pattern of the first product ions; and
  to identify and/or characterise the first ions using the pattern of the first product ions.

12. The spectrometer of claim 11, wherein the first physico-chemical property comprises ion mobility or rate of change of ion mobility with electric field strength.

13. The spectrometer of claim 11, further comprising an ion source configured to generate the analyte ions;
  wherein the analyte ions, the first ions and/or the first product ions are polymeric; and/or
  wherein the analyte ions, the first ions and/or the first product ions are isomeric.

14. The spectrometer of claim 11, wherein:
  the analyte ions comprise isomeric polymeric analyte ions of a particular order, and the first product ions comprise polymeric product ions of a plurality of different orders, each order of the plurality of different orders being less than the particular order of the isomeric polymeric analyte ions.

15. The spectrometer of claim 14, wherein the control system is configured to determine the pattern of the first product ions by:
  determining, in respect of one or more or each order of the plurality of different orders, the number of isomers of that order that are present in the first product ions.

16. The spectrometer of claim 11, wherein the control system is configured to characterise the first ions using the pattern of the first product ions by determining structural information of the first ions from the pattern of the first product ions.

17. The spectrometer of claim 11, wherein the control system is configured:
  to cause second ions of the analyte ions to be selected, and to cause the one or more activation, collision, fragmentation or reaction devices to activate, fragment or react the second ions to produce second product ions;
  to cause the one or more separators to separate the second product ions according to the first physico-chemical property;
  to determine a pattern of the second product ions; and
  to identify and/or characterise the first and/or second ions using the pattern of the second product ions.

18. The spectrometer of claim 11, wherein the control system is configured:
  to cause particular ions of the first product ions to be selected, and to cause the one or more activation, collision, fragmentation or reaction devices to activate, fragment or react the particular ions to produce second generation product ions; and
  to cause the one or more separators to separate the second generation product ions according to the first physico-chemical property; and
  to determine a pattern of the second generation product ions;
  wherein the pattern of the first product ions includes the pattern of the second generation product ions.

19. The spectrometer of claim 11, wherein the one or more separators comprise a cyclic or closed-loop separator.

20. A computer readable medium storing software code, which when executing on a processor, causes the processor to perform a method of identifying and/or characterising molecules, the method comprising:
  determining a pattern of first product ions, the first product ions being produced by separating analyte ions according to a first physico-chemical property, selecting first ions of the analyte ions and fragmenting or reacting the first ions to produce the first product ions; and
  identifying and/or characterising the first ions using the pattern of the first product ions.

* * * * *